(12) United States Patent
Tabata et al.

(10) Patent No.: US 7,578,765 B2
(45) Date of Patent: Aug. 25, 2009

(54) DRIVE APPARATUS FOR VEHICLE AND METHOD OF CONTROLLING DRIVE APPARATUS FOR VEHICLE

(75) Inventors: Atsushi Tabata, Okazaki (JP); Takuma Kakinami, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 436 days.

(21) Appl. No.: 11/655,240

(22) Filed: Jan. 19, 2007

(65) Prior Publication Data

US 2007/0197336 A1 Aug. 23, 2007

(30) Foreign Application Priority Data

Jan. 31, 2006 (JP) .............................. 2006-022252

(51) Int. Cl.
*B60W 10/08* (2006.01)
*B60W 10/02* (2006.01)

(52) U.S. Cl. ........................ 477/5; 477/4; 477/6; 475/5; 475/116

(58) Field of Classification Search ...................... 477/2, 477/3, 4, 5, 6, 906; 475/5, 116; 180/65.23, 180/65.235, 65.26, 65.285, 65.7

See application file for complete search history.

(56) References Cited

U.S. PATENT DOCUMENTS

| | | | |
|---|---|---|---|
| 6,793,034 B2 * | 9/2004 | Raftari et al. ................ | 180/285 |
| 2007/0155583 A1 * | 7/2007 | Tabata et al. ................... | 477/37 |

FOREIGN PATENT DOCUMENTS

| | | |
|---|---|---|
| JP | 09-190233 A | 7/1997 |
| JP | 2005-133856 A | 5/2005 |
| JP | 2005-206136 A | 8/2005 |

\* cited by examiner

*Primary Examiner*—David D. Le
(74) *Attorney, Agent, or Firm*—Sughrue Mion, PLLC

(57) ABSTRACT

When a vehicle condition is in a region where limitation of the differential action of a differential portion should be stopped, for example in a CVT control region or a motor-driven region, a cutoff device prohibits the limitation of the differential action. Therefore, if the differential action may be limited due to a failure when the vehicle condition is in the region where the limitation of the differential action should be stopped, the fail-safe function is performed to prohibit the limitation of the differential action. This avoids the situation where fuel efficiency is decreased, driveability is deteriorated, and a shock is caused by limiting the differential action.

4 Claims, 13 Drawing Sheets

FIG. 2

| | C0 | C1 | C2 | B0 | B1 | B2 | B3 | SPEED RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | ○ | | ○ | | | | ○ | 3.209 | |
| N | | | | | | | | | |

FIG. 13

| | C0 | C1 | C2 | B0 | B1 | B2 | SPEED RATIO | STEP | |
|---|---|---|---|---|---|---|---|---|---|
| 1st | ◎ | ○ | | | | ○ | 2.804 | 1.54 | |
| 2nd | ◎ | ○ | | | ○ | | 1.531 | 1.53 | |
| 3rd | ◎ | ○ | ○ | | | | 1.000 | 1.42 | |
| 4th | | ○ | ○ | ◎ | | | 0.705 | TOTAL 3.977 | |
| R | | | ○ | | | ○ | 2.393 | | |
| N | ○ | | | | | | | | |

DRIVE APPARATUS FOR VEHICLE AND METHOD OF CONTROLLING DRIVE APPARATUS FOR VEHICLE

INCORPORATION BY REFERENCE

The disclosure of Japanese Patent Application No. 2006-022252 filed on Jan. 31, 2006 including the specification, drawings and abstract is incorporated herein by reference in its entirety.

BACKGROUND OF THE INVENTION

1. Field of the Invention

The invention relates to a drive apparatus for a vehicle, which includes an electric differential device that includes a differential mechanism that can perform a differential action and a motor; and a differential-action limitation device that limits the differential action of the differential device, and to a method of controlling a drive apparatus for a vehicle. More particularly, the invention relates to the limitation of a differential action using a differential-action limitation device.

2. Description of the Related Art

There is a known drive apparatus for a vehicle, which includes a differential mechanism that distributes an output from an engine to a first motor and an output shaft; a second motor provided between the output shaft of the differential mechanism, and a driving wheel; and a differential-action limitation device that limits the differential action of the differential mechanism. The mode of the differential mechanism is switched between a differential mode and a non-differential mode, based on an actual vehicle condition, according to a relation defined based on a vehicle condition. When the differential mechanism is in the differential mode, a differential action can be performed. When the differential mechanism is in the non-differential mode, the differential action is limited.

For example, Japanese Patent Application Publication No. 2005-206136 (JP-A-2005-206136) describes the above-described drive apparatus for a vehicle. In the drive apparatus for a vehicle, the differential mechanism includes, for example, a planetary gear unit. The main part of power output from the engine is mechanically transmitted to the driving wheel using the differential action, and the rest of the power output from the engine is electrically transmitted using an electric path from the first motor to the second motor. As a result, the differential mechanism functions as a transmission in which the speed ratio is continuously changed, for example, an electric continuously variable transmission. A control device controls the differential mechanism to drive a vehicle while maintaining the engine in an optimum operating state. Thus, fuel efficiency is improved.

In the differential mechanism, a clutch and a brake, which are regarded as the differential-action limitation device, are provided. By engaging the clutch or the brake, the mode of the differential mechanism is switched from the differential mode to the non-differential mode, that is, a locked mode. Thus, it is possible to obtain the drive apparatus that has the advantage of the transmission in which the speed ratio is electrically changed, that is, the effect of improving fuel efficiency, and the advantage of a gear type transmission device that mechanically transmits power, that is, high transmission efficiency. For example, by placing the differential mechanism in the differential mode when the vehicle is driven at a low-to-intermediate vehicle speed or at a low-to-intermediate output, that is, when the output from the engine is in a normal range, high fuel efficiency is achieved. By placing the differential mechanism in the locked mode when the vehicle is driven at a high vehicle speed and at a high output, the output from the engine is transmitted to the driving wheel only through the mechanical power transmission path. This prevents the loss in the conversion between the power and the electric energy, which would be caused when the differential mechanism is operated as the transmission in which the speed ratio is electrically changed. Thus, fuel efficiency is improved. In the case where the differential mechanism is placed in the locked mode when the vehicle is driven at a high vehicle speed, the differential mechanism functions as the transmission in which the speed ratio is electrically changed when the vehicle is driven at a low-to-intermediate vehicle speed and at a low-to-intermediate output. This reduces the maximum value of the electric energy that should be generated by the motor, that is, the maximum value of the electric energy that should be transmitted by the motor. This further reduces the size of the motor, or the drive apparatus for the vehicle, which includes the motor.

However, if a failure or the like occurs in an electromagnetic valve that supplies an engagement hydraulic pressure to engage the clutch or the brake, the differential mechanism is placed in the locked mode when the vehicle condition is in a region other than a region where the differential mechanism should be placed in the locked mode, that is, in a region where the differential mechanism should be placed in the differential mode, for example, in a region where the vehicle is driven at a low-to-intermediate vehicle speed and at a low-to-intermediate output. Therefore, the fuel efficiency of the vehicle may decrease, driveability may deteriorate, and a shock may occur.

SUMMARY OF THE INVENTION

The invention avoids the situation where fuel efficiency is decreased, driveability is deteriorated, and a shock is caused by limiting a differential action of a differential mechanism using a differential-action limitation device in a drive apparatus for a vehicle, which includes a differential mechanism that distributes an output from an engine of a vehicle to a first motor and a transmitting member, and that performs the differential action; a second motor provided in a power transmission path from the differential mechanism to a driving wheel; and the differential-action limitation device that limits the differential action.

A first aspect of the invention relates to a drive apparatus for a vehicle. The drive apparatus for a vehicle includes a differential portion that includes a differential mechanism that distributes an output from an engine of a vehicle to a first motor and a transmitting member, and a second motor provided in a power transmission path from the transmitting member to a driving wheel; a differential-action limitation device that limits a differential action of the differential portion by limiting a differential action of the differential mechanism based on an actual vehicle condition, using regions defined based on a vehicle condition; and a cutoff device that permits the differential-action limitation device to limit the differential action of the differential portion when the actual vehicle condition is in a region where the differential action should be limited, and that prohibits the differential-action limitation device from limiting the differential action when the actual vehicle condition is in a region where limitation of the differential action should be stopped.

Thus, the cutoff device permits the differential-action limitation device to limit the differential action of the differential portion when the actual vehicle condition is in the region where the differential action should be limited, and prohibits the differential-action limitation device from limiting the differential action when the actual vehicle condition is in the region where the limitation of the differential action should be stopped. Therefore, if the differential-action limitation device may limit the differential action of the differential portion due to a failure when the actual vehicle condition is in the region where the limitation of the differential action should be stopped, the fail-safe function is performed to prohibit the differential-action limitation device from limiting the differential action. This avoids the situation where fuel efficiency is decreased, driveability is deteriorated, and a shock is caused by limiting the differential action using the differential-action limitation device.

A second aspect of the invention relates to a drive apparatus for a vehicle. The drive apparatus for a vehicle includes a differential portion that includes a differential mechanism that distributes an output from an engine of a vehicle to a first motor and a transmitting member, and a second motor provided in a power transmission path from the transmitting member to a driving wheel; a differential-action limitation device that limits a differential action of the differential portion by limiting a differential action of the differential mechanism; a switching control device that limits the differential action of the differential portion using the differential-action limitation device, or stops limitation of the differential action using the differential-action limitation device, based on an actual vehicle condition, using regions defined based on a vehicle condition; a cutoff device whose mode is selectively switched between a permission mode for permitting the differential-action limitation device to limit the differential action of the differential portion, and a prohibition mode for prohibiting the differential-action limitation device from limiting the differential action; a differential-action limitation determination device that determines whether the differential action of the differential portion is being limited by the differential-action limitation device; and a fail-safe control device that places the cutoff device in the prohibition mode when the actual vehicle condition is in a region where the switching control device should stop the limitation of the differential action of the differential portion, and the differential-action limitation determination device determines that the differential action of the differential portion is being limited.

With this configuration, when the actual vehicle condition is in the region where the switching control device should stop the limitation of the differential action of the differential portion, and the differential-action limitation determination device determines that the differential action of the differential portion is being limited, the cutoff device, whose mode is selectively switched between the permission mode for permitting the differential-action limitation device to limit the differential action, and the prohibition mode for prohibiting the differential-action limitation device from limiting the differential action, is placed in the prohibition mode by the fail-safe control device. Therefore, if the differential-action limitation device may limit the differential action of the differential portion due to a failure when the actual vehicle condition is in the region where the switching control device should stop the limitation of the differential action of the differential portion, the fail-safe function is performed to prohibit the differential-action limitation device from limiting the differential action. This avoids the situation where fuel efficiency is decreased, driveability is deteriorated, and a shock is caused by limiting the differential action using the differential-action limitation device.

A third aspect of the invention relates to a method of controlling a drive apparatus for a vehicle. The method includes determining whether an actual vehicle condition is in a region where a differential action of a differential portion should be limited, wherein the differential portion includes a differential mechanism that distributes an output from an engine of a vehicle to a first motor and a transmitting member, and a second motor provided in a power transmission path from the transmitting member to a driving wheel; permitting a differential-action limitation device, which limits the differential action of the differential portion, to limit the differential action when it is determined that the actual vehicle condition is in the region where the differential action should be limited; and prohibiting the differential-action limitation device from limiting the differential action when it is determined that the actual vehicle condition is in a region where limitation of the differential action should be stopped.

A fourth aspect of the invention relates to a method of controlling a drive apparatus for a vehicle. The method includes determining whether an actual vehicle condition is in a region where a differential action of a differential portion should be limited, wherein the differential portion includes a differential mechanism that distributes an output from an engine of a vehicle to a first motor and a transmitting member, and a second motor provided in a power transmission path from the transmitting member to a driving wheel; determining whether the differential action of the differential portion is being limited; and placing a cutoff device in a prohibition mode when it is determined that the actual vehicle condition is in a region where limitation of the differential action of the differential portion should be stopped, and the differential action of the differential portion is being limited, wherein the mode of the cutoff device is selectively switched between a permission mode for permitting the limitation of the differential action of the differential portion, and the prohibition mode for prohibiting the limitation of the of the differential action.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is an operation table explaining the relation between the shift operation when the drive apparatus for a hybrid vehicle according to the embodiment in FIG. 1 is operated in a CVT mode or a stepped shift mode, and the combination of the operations of the hydraulic frictional engagement devices;

FIG. 13 is an operation table explaining the relation between the shift operation when the drive apparatus for a hybrid vehicle according to the embodiment in FIG. 12 is operated in the CVT mode or the stepped shift mode, and the combination of the operations of the hydraulic frictional engagement devices, FIG. 13 corresponding to FIG. 2;

DETAILED DESCRIPTION OF THE EXAMPLE EMBODIMENTS

Hereinafter, embodiments of the invention will be described in detail with reference to the drawings.

Figure 1:
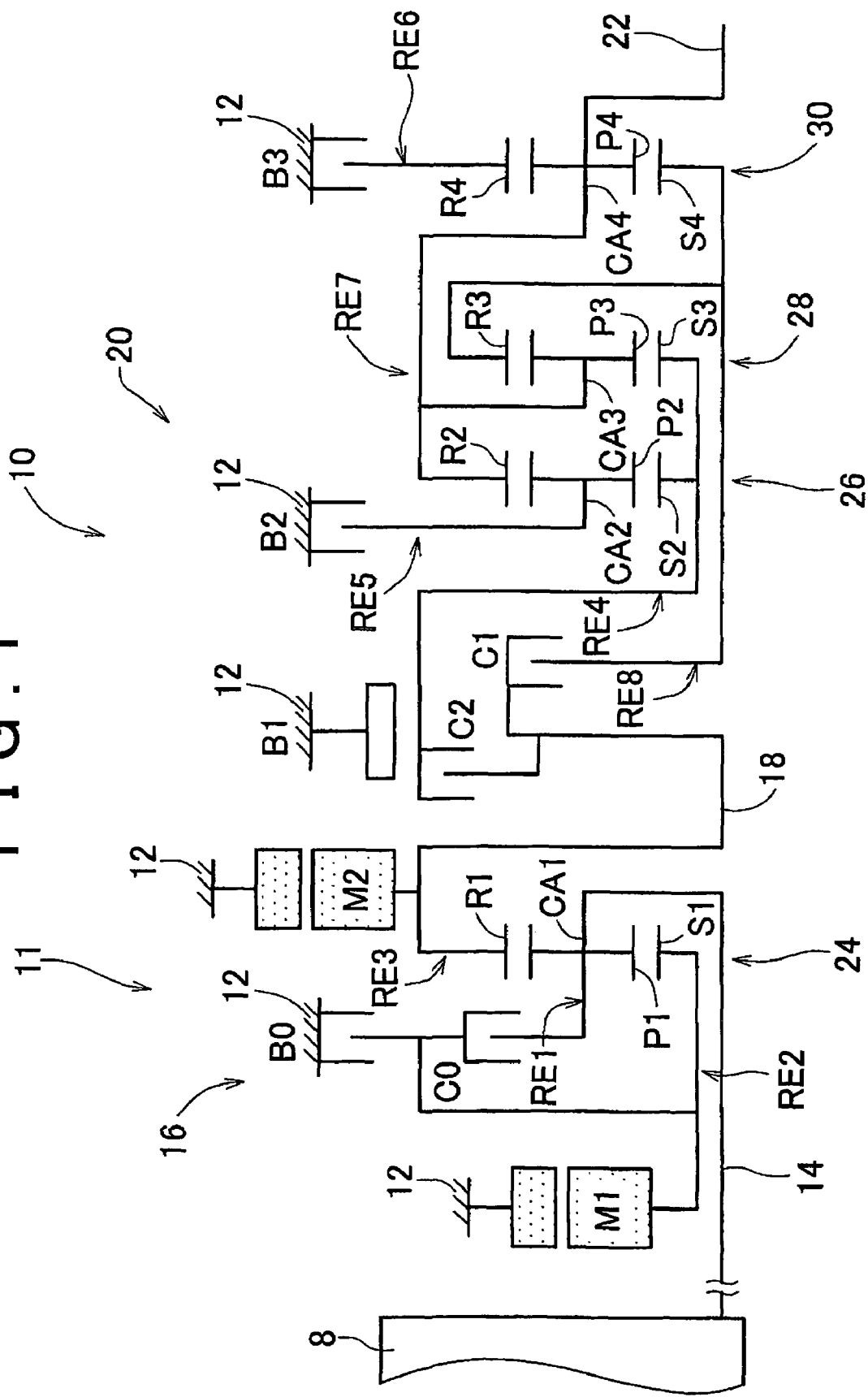
FIG. 1 is a schematic diagram explaining the configuration of a drive apparatus for a hybrid vehicle, according to an embodiment of the invention.

FIG. 1 is a schematic diagram explaining a shift mechanism 10 that constitutes a part of a drive apparatus for a hybrid vehicle to which the invention is applied. In FIG. 1, the shift mechanism 10 includes an input shaft 14, a differential portion 11, an automatic shift portion 20, and an output shaft 22 that are provided in series on a common axis in a transmission case (hereinafter, simply referred to as "case") 12. The transmission case 12, which is a non-rotational member, is fitted to a vehicle body. The input shaft 14 is an input rotational member. The differential portion 11, which is a CVT portion, is directly connected to the input shaft 14, or indirectly connected to the input shaft 14 via a pulsation absorption damper (i.e., a vibration-damping device; not shown) or the like. The automatic shift portion 20 is a stepped shift portion that functions as a stepped transmission. The automatic shift portion 20 is provided in a power transmission path between the differential portion 11 and drive wheels 38, and directly connected to the differential portion 11 via a transmitting member (transmitting shaft) 18. The output shaft 22, which is an output rotational member, is connected to the automatic transmission portion 20. For example, the shift mechanism 10 is provided in a front-engine rear-wheel-drive vehicle where an engine is longitudinally disposed. The shift mechanism 10 is provided in the power transmission path between an internal combustion engine (hereinafter, simply referred to as "engine") 8 such as a gasoline engine or a diesel engine, and a pair of drive wheels 38 (refer to FIG. 6). The engine 8 is a driving power source for driving the vehicle, which is directly connected to the input shaft 14, or indirectly connected to the input shaft 14 via the pulsation absorption damper (not shown). The shift mechanism 10 transmits power from the engine 8 to the pair of drive wheels 38 via a differential gear unit (final reducer) 36, a pair of axles, and the like, which constitute a part of the power transmission path.

Figure 12:
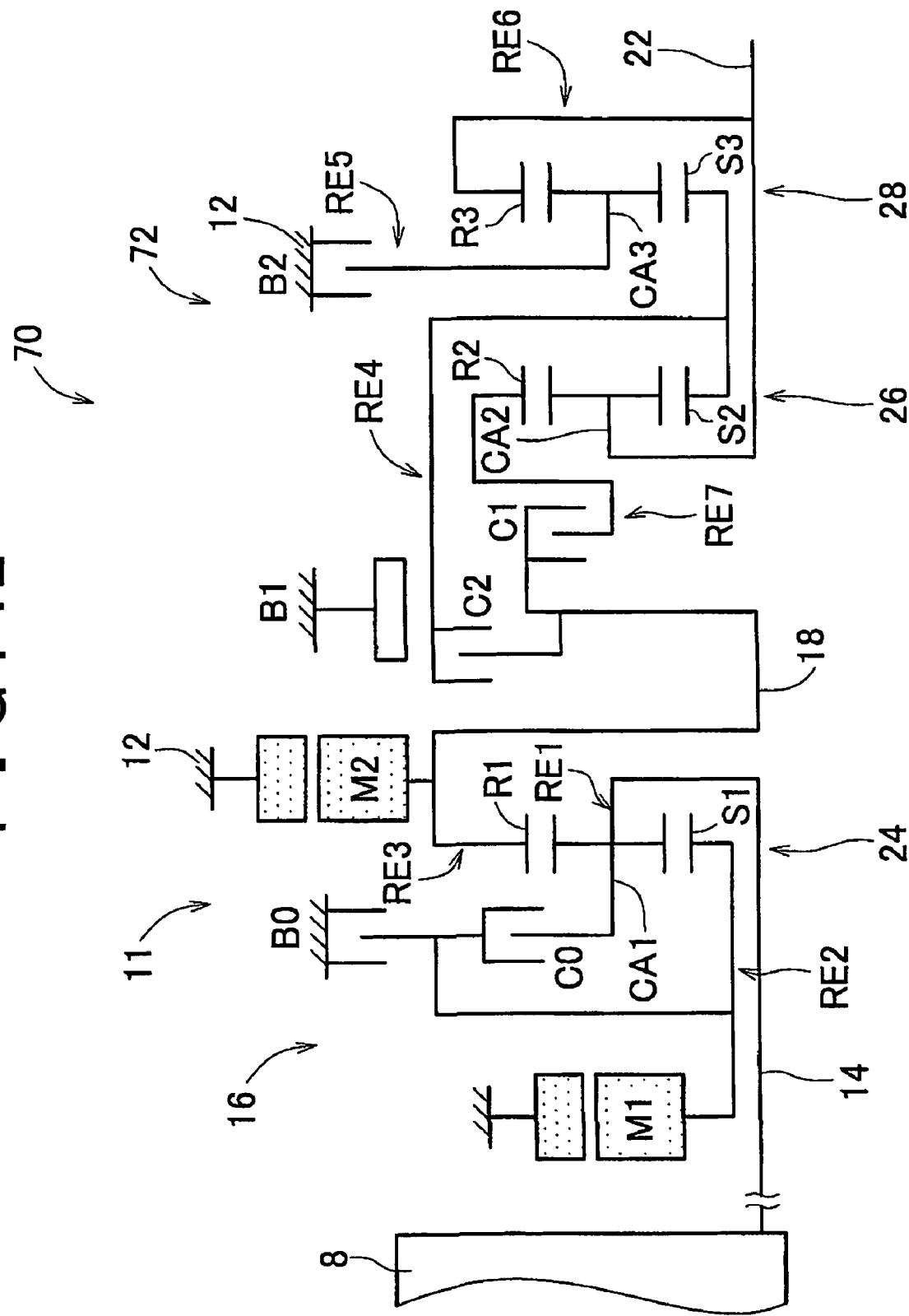
FIG. 12 is a schematic diagram explaining the configuration of a driving apparatus for a hybrid vehicle according to another embodiment of the invention, FIG. 12 corresponding to FIG. 1.

Thus, the engine 8 is directly connected to the differential 11 in the shift mechanism 10 in the embodiment. That is, the engine 8 is connected to the differential portion 11 without providing a fluid transmission device such as a torque converter or a fluid coupling between the engine 8 and the differential portion 11. For example, when the engine 8 is connected to the differential portion 11 via the above-described pulsation absorption damper, it is regarded that the engine 8 is directly connected to the differential portion 11. Because the configuration of the shift mechanism 10 is symmetric with respect to the axis thereof, the lower portion of the shift mechanism 10 is omitted in the schematic diagram in FIG. 1. In FIG. 12 that show another embodiment described later, the lower portion of the shift mechanism 10 is similarly omitted.

The differential portion 11 includes a first motor M1, a power split mechanism 16, and a second motor M2. The power split mechanism 16 is a mechanical mechanism that mechanically distributes the output from the engine 8, which is input to the input shaft 14. That is, the power split mechanism 16 is a differential mechanism that distributes the output from the engine 8 to the first motor M1 and the transmitting member 18. The second motor M2 is rotated integrally with the transmitting member 18. The second motor M2 may be provided at any position in the power transmission path between the transmitting member 18 and the drive wheels 38. Each of the first motor M1 and the second motor M2 in the embodiment is a so-called motor-generator that has the function of generating electric power (power-generation function). The first motor M1 has at least the power-generation function for bearing a reaction force. The second motor M2 has at least a motor function for outputting the driving power as the driving power source.

The power split mechanism 16 includes a first planetary gear unit 24, a switching clutch C0, and a switching brake B0. The first planetary gear unit 24 is of a single pinion type, and has a predetermined gear ratio $\rho1$ of, for example, approximately "0.418". The first planetary gear unit 24 includes a first sun gear S1, a first planetary gear P1, a first carrier CA1, and a first ring gear R1. The first carrier CA1 supports the first planetary gear P1 so that the first planetary gear P1 rotates on its axis, and moves around the first sun gear S1. The first ring gear R1 engages with the first sun gear S1 via the first planetary gear P1. The gear ratio $\rho1$ is equal to ZS1/ZR1. In this equation, ZS1 represents the number of teeth of the first sun gear S1, and ZR1 represents the number of teeth of the first ring gear R1.

In the power split mechanism 16, the first carrier CA1 is connected to the input shaft 14, that is, the engine 8. The first sun gear S1 is connected to the first motor M1. The first ring gear R1 is connected to the transmitting member 18. The switching brake B0 is provided between the first sun gear S1 and the case 12. The switching clutch C0 is provided between the first sun gear S1 and the first carrier CA1. When the switching clutch C0 and the switching brake B0 are disengaged, the three elements of the first planetary gear unit 24, that are, the first sun gear S1, the first carrier CA1, and the first ring gear R1 can be rotated relative to each other. As a result, the power split mechanism 16 is placed in a differential mode in which the differential action is performed, that is, the differential action can be performed. Thus, the output from the engine 8 is distributed to the first motor M1 and the transmitting member 18. Also, electric energy is generated by the first motor M1 using the output from the engine 8 distributed to the first motor M1, and the generated electric energy is accumulated. The second motor M2 is rotated using the electric energy generated by the first motor M1. Thus, the differential portion 11 (the power split mechanism 16) functions as an electric differential device. Accordingly, for example, the differential portion 11 is placed in a so-called continuously-variable transmission (CVT) mode (electric CVT mode). That is, the differential portion 11 continuously changes the rotational speed of the transmitting member 18, regardless of the rotational speed of the engine 8. That is, when the power split mechanism 16 is placed in the differential mode, the differential portion 11 is also placed in the differential mode. Thus, the differential portion 11 is placed in the CVT mode, that is, the differential portion 11 functions as the electric CVT in which a speed ratio γ0 (the rotational speed of the input shaft 14/the rotational speed of the transmitting member 18) is continuously changed from the minimum value γ0 min to the maximum value γ0 max.

If the switching clutch C0 or the switching brake B0 is engaged when the differential portion 11 is in the above-described mode, the power split mechanism 16 is placed in a non-differential mode in which the differential action is not performed, that is, the differential action cannot be performed. More specifically, when the switching clutch C0 is engaged, and the first sun gear S1 is integrally connected with first carrier CA1, the three elements of the first planetary gear unit 24 (i.e., the first sun gear S1, the first carrier CA1, and the first ring gear R1) are connected to each other so that the three elements are rotated together. As a result, the power split mechanism 16 is placed in the locked mode, that is, the non-differential mode. Therefore, the differential portion 11 is also placed in the non-differential mode. Also, because the rotational speed of the engine 8 is equal to the rotational speed of the transmitting member 18, the differential portion 11 (the power split mechanism 16) is placed in a stepped shift mode (or a speed-ratio fixed mode). That is, the differential portion 11 (the power split mechanism 16) functions as a transmission in which the speed ratio γ0 is fixed to "1".

When the switching brake B0 is engaged instead of the switching clutch C0, and therefore the first sun gear S1 is connected to the case 12, the first sun gear S1 is locked, and the power split mechanism 16 is placed in the non-differential mode. Therefore, the differential portion 11 is also placed in the non-differential mode. Also, the first ring gear R1 is rotated at the speed higher than the speed at which the first carrier CA1 is rotated. That is, the power split mechanism 16 functions as a speed-increasing mechanism. The differential portion 11 (the power split mechanism 16) is placed in the stepped shift mode, that is, the differential portion 11 (the power split mechanism 16) functions as a speed-increasing transmission in which the speed ratio γ0 is fixed to a value smaller than "1", for example, approximately 0.7.

Thus, in the embodiment, the switching clutch C0 and the switching brake B0 function as differential-mode switching devices. In other words, the switching clutch C0 and the switching brake B0 selectively switch the mode of the differential portion 11 (the power split mechanism 16) between the differential mode and the non-differential mode, that is, between the CVT mode and the stepped shift mode (e.g., the locked mode, the speed-ratio fixed mode, or the non-differential mode). In the CVT mode, the differential portion 11 (the power split mechanism 16) functions as the electric CVT in which the speed ratio is continuously changed. In the stepped shift mode (e.g., the locked mode, the speed-ratio fixed mode, or the non-differential mode), the electric CVT operation is not performed, that is, the differential portion 11 (the power split mechanism 16) is not operated as the electric CVT, and at least one fixed speed ratio is achieved. That is, the differential portion 11 (the power split mechanism 16) is operated as a transmission with at least one speed, in which at least one fixed speed ratio is achieved.

In other words, when the switching clutch C0 or the switching brake B0 is engaged, the power split mechanism 16 is placed in the non-differential mode, and the differential action of the power split mechanism 16 is limited. As a result, the differential portion 11 is placed in the stepped shift mode, and the differential action of the differential portion 11 is limited. Thus, each of the switching clutch C0 and the switching brake B0 functions as a differential-action limitation device. The switching clutch C0 and the switching brake B0 also place the power split mechanism 16 in the differential mode so that the differential action of the power split mechanism 16 is not limited. In this case, the differential portion 11 is placed in the CVT mode, and the operation of the differential portion 11, which functions as the electric differential device, is not limited. The state of the power split mechanism 16 (for example, the speed ratio γ0) when the differential action of the power split mechanism 16 is limited by engaging the switching clutch C0 differs from the state of the power split mechanism 16 when the differential action of the power split mechanism 16 is limited by engaging the switching brake B0. The switching clutch C0 is regarded as the first hydraulic engagement device. The switching brake B0 is regarded as the second hydraulic engagement device.

The automatic shift portion 20 includes a second planetary gear unit 26 of a single pinion type, a third planetary gear unit 28 of a single pinion type, and a fourth planetary gear unit 30 of a single pinion. The automatic shift portion 20 functions as a stepped automatic transmission. The second planetary gear unit 26 includes a second sun gear S2, a second planetary gear P2, a second carrier CA2, and a second ring gear R2. The second carrier CA2 supports the second planetary gear P2 such that the second planetary gear P2 rotates on its axis, and moves around the second sun gear S2. The second ring gear R2 engages with the second sun gear S2 via the second planetary gear P2. The second planetary gear unit 26 has a predetermined gear ratio ρ2 of, for example, approximately "0.562". The third planetary gear unit 28 includes a third sun gear S3, a third planetary gear P3, a third carrier CA3, and a third ring gear R3. The third carrier CA3 supports the third planetary gear P3 such that the third planetary gear P3 rotates on its axis, and moves around the third sun gear S3. The third ring gear R3 engages with the third sun gear S3 via the third planetary gear P3. The third planetary gear unit 28 has a predetermined gear ratio ρ3 of, for example, approximately "0.425". The fourth planetary gear unit 30 includes a fourth sun gear S4, a fourth planetary gear P4, a fourth carrier CA4, and a fourth ring gear R4. The fourth carrier CA4 supports the fourth planetary gear P4 such that the fourth planetary gear P4 rotates on its axis, and moves around the fourth sun gear S4. The fourth ring gear R4 engages with the fourth sun gear S4 via the fourth planetary gear P4. The fourth planetary gear unit 30 has a predetermined gear ratio ρ4 of, for example, approximately "0.421". The gear ratio ρ2 is equal to ZS2/ZR2. In this equation, ZS2 represents the number of teeth of the second sun gear S2, and ZR2 represents the number of teeth of the second ring gear R2. The gear ratio ρ3 is equal to ZS3/ZR3. In this equation, ZS3 represents the number of teeth of the third sun gear S3. ZR3 represents the number of teeth of the third ring gear R3. The gear ratio ρ4 is equal to ZS4/ZR4. In this equation, ZS4 represents the number of teeth of the fourth sun gear S4. ZR4 represents the number of teeth of the fourth ring gear R4.

In the automatic shift portion 20, the second sun gear S2 and the third sun gear S3, which are integrally connected to each other, are selectively connected to the transmitting member 18 via the second clutch C2. Also, the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4, which are integrally connected to each other, are connected to the output shaft 22. The third ring gear R3 and the fourth sun gear S4, which are integrally connected to each other, are selectively connected to the transmitting member 18 via the first clutch C1. Thus, the automatic shift portion 20 is selectively connected to the transmitting member 18 via the first clutch C1 and the second clutch C2 that are used to select the gear of the automatic shift portion 20. In other words, each of the first clutch C1 and the second clutch C2 functions as an engagement device that selectively allows and interrupts the transmission of power in the power transmission path between the transmitting member 18 and the automatic shift portion 20, that is, between the differential portion 11 (the transmitting member 18) and the drive wheels 38. That is, when at least one of the first clutch C1 and the second clutch C2 is engaged, the transmission of power is allowed in the power transmission path. When the first clutch C1 and the second clutch C2 are disengaged, the transmission of power is interrupted in the power transmission path. The automatic shift portion 20 is the stepped transmission in which a clutch-to-clutch shift is performed when a hydraulic frictional engagement device that needs to be disengaged (hereinafter, referred to as "disengagement-side engagement device) is disengaged, and a hydraulic frictional engagement device that needs to be engaged (hereinafter, referred to as "engagement-side engagement device) is engaged.

The switching clutch C0, the first clutch C1, the second clutch C2, the switching brake B0, the first brake B1, the second brake B2, and the third brake B3 (hereinafter, collectively referred to as "clutches C" and "brakes B" unless a specific clutch or a specific brake needs to be distinguished from the other clutches or the other brakes) are hydraulic frictional engagement devices that are generally used in conventional automatic transmissions. Each of the clutches C may be a wet multiple disc type clutch in which a plurality of stacked frictional plates are pressed by a hydraulic actuator. Each of the brakes B may be a band brake in which at least one band is wound around the outer peripheral surface of a drum that is rotated, and one end of the at least one band is tightened by a hydraulic actuator. Each of the clutches C and the brakes B selectively connects members that are provided on both sides thereof.

Particularly in this embodiment, the switching clutch C0 and the switching brake B0 are provided in the power split mechanism 16 in the shift mechanism 10 that has the above-described configuration. Accordingly, by engaging the switching clutch C0 or the switching brake B0, the differential portion 11 can be placed in the stepped shift mode (speed-ratio fixed mode), that is, the differential portion 11 is operated as the stepped transmission with at least one fixed speed ratio. Thus, when the differential portion 11, which is placed in the speed-ratio fixed mode by engaging the switching clutch C0 or the switching brake B0, is combined with the automatic shift portion 20, the shift mechanism 10 is placed in the stepped shift mode, that is, the shift mechanism 10 is operated as the stepped transmission. When the differential portion 11, which is placed in the CVT mode by disengaging both of the switching clutch C0 and the switching brake B0, is combined with the automatic shift portion 20, the shift mechanism 10 is placed in the CVT mode, that is, the shift mechanism 10 is operated as the electric CVT. In other words, the shift mechanism 10 is placed in the stepped shift mode by engaging the switching clutch C0 or the switching brake B0. The shift mechanism 10 is placed in the CVT mode by disengaging both of the switching clutch C0 and the switching brake B0. The differential portion 11 is also regarded as the transmission whose mode can be switched between the stepped shift mode and the CVT mode.

More specifically, when the differential portion 11 is placed in the stepped shift mode, and the shift mechanism 10 functions as the stepped transmission, the switching clutch C0 or the switching brake B0 is engaged, and the first clutch C1, the second clutch C2, the first brake B1, the second brake B2, and the third brake B3 are selectively engaged. That is, for example, in the automatic shift portion 20, the disengagement-side engagement device relating to the shift is disengaged, and the engagement-side engagement device relating to the shift is engaged. Thus, the speed ratio is automatically selected. That is, any one of a first gear to a fifth gear, or a reverse gear, or a neutral state is selected. That is, a total speed ratio γT (=the input-shaft rotational speed $N_{IN}$/the output-shaft rotational speed $N_{OUT}$) of the shift mechanism 10 at each gear is achieved. The total speed ratio γT changes substantially geometrically. The total speed ratio γT of the entire shift mechanism 10 is achieved based on the speed ratio γ0 of the differential portion 11, and the speed ratio γ of the automatic shift portion 20.

As shown in an engagement operation table in FIG. 2, for example, when the shift mechanism 10 functions as the stepped transmission, the first gear, at which a speed ratio γ1 is set to the maximum value, for example, approximately "3.357", is selected by engaging the switching clutch C0, the first clutch C1, and the third brake B3. The second gear, at which a speed ratio γ2 is set to a value smaller than the speed ratio γ1, for example, approximately "2.180", is selected by engaging the switching clutch C0, the first clutch C1, and the second brake B2. The third gear, at which a speed ratio γ3 is set to a value smaller than the speed ratio γ2, for example, approximately "1.424", is selected by engaging the switching clutch C0, the first clutch C1, and the first brake B1. The fourth gear, at which a speed ratio γ4 is set to a value smaller than the speed ratio γ3, for example, approximately "1.000", is selected by engaging the switching clutch C0, the first clutch C1, and the second clutch C2. The fifth gear, at which a speed ratio γ5 is set to a value smaller than the speed ratio γ4, for example, approximately "0.705", is selected by engaging the first clutch C1, the second clutch C2, and the switching brake B0. The "reverse gear", at which a speed ratio γR is set to a value between the speed ratios γ1 and γ2, for example, approximately "3.209", is selected by engaging the second clutch C2 and the third brake B3. The reverse gear is selected when the differential portion 11 is in the CVT mode. The neutral state "N" is selected, for example, by engaging only the switching clutch C0. In FIG. 2, a circle indicates that the brake or the clutch is engaged. A double circle indicates that the brake or the clutch is engaged when the differential portion 11 is in the stepped shift mode, and the brake or the clutch is disengaged when the differential portion 11 is in the CVT mode.

When the differential portion 11 is placed in the CVT mode, and the shift mechanism 10 functions as the CVT, both of the switching clutch C0 and the switching brake 130 are disengaged, the differential portion 11 functions as the CVT, and the automatic shift portion 20, which is directly connected to the differential portion 11, functions as the stepped transmission. Thus, the rotational speed $N_{IN}$ input to the automatic transmission 20, that is, the rotational speed of the transmitting member 18 is continuously changed at at least one gear M of the automatic shift portion 20. That is, the speed ratio is continuously changed in a certain range at the at least one gear M. Accordingly, the total speed ratio γT of the shift mechanism 10 is continuously changed.

In other words, as shown in the engagement operation table in FIG. 2, for example, when the shift mechanism 10 functions as the CVT, both of the switching clutch C0 and the switching brake B0 are disengaged, and the rotational speed $N_{IN}$ input to the automatic transmission 20 is continuously changed at each of the first gear to fourth gear (the clutches C1 and C2 are engaged at the fifth gear as well as at the fourth gear). That is, the speed ratio is continuously changed in a certain range at each of the first gear to the fourth gear. As a result, the speed ratio is continuously changed between the first gear and the second gear, between the second gear and the third gear, and the third gear and the fourth gear. Accordingly, the total speed ratio γT of the entire shift mechanism 10 is continuously changed.

Figure 3:
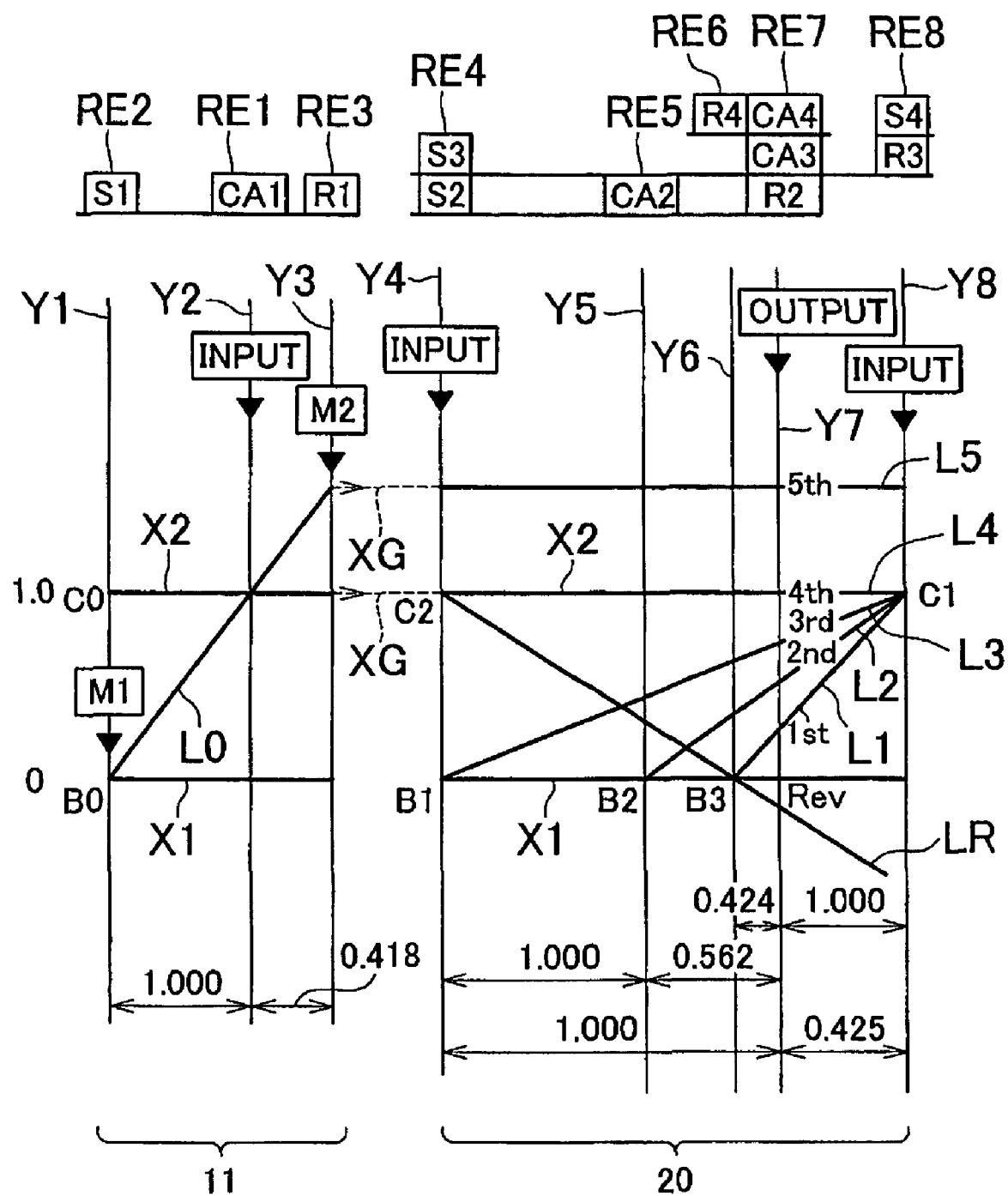
FIG. 3 is a collinear diagram explaining the relative rotational speeds at each gear when the drive apparatus for a hybrid vehicle according to the embodiment in FIG. 1 is operated in the stepped shift mode.

FIG. 3 is a collinear diagram in which straight lines indicate the relative relation among the rotational speeds of the rotational elements in the shift mechanism 10 that includes the differential portion 11 and the automatic shift portion 20. Each of the rotational elements is in a connected state or disconnected state at each gear. The differential portion 11 functions as the CVT portion or the first shift portion. The automatic shift portion 20 functions as the stepped shift portion or the second shift portion. The collinear diagram in FIG. 3 is a two-dimensional coordinate. In the collinear diagram in FIG. 3, the horizontal axis indicates the relation among the gear ratios ρ of the planetary gear units 24, 26, 28, and 30, and the vertical axis indicates relative rotational speeds. The lowest horizontal line X1 among the three horizontal lines indicates the rotational speed of "0". The upper horizontal line X2 indicates the rotational speed of "1.0", that is, a rotational speed $N_E$ of the engine 8 connected to the input shaft 14. The horizontal line XG indicates the rotational speed of the transmitting member 18.

The three vertical lines Y1, Y2, and Y3 indicate the relative rotational speeds of the three rotational elements of the power split mechanism 16 of the differential portion 11. That is, the vertical line Y1 indicates the relative rotational speed of the first sun gear S1 that is regarded as a second rotational element (second element) RE2 in FIG. 1. The vertical line Y2 indicates the relative rotational speed of the first carrier CA1 that is regarded as a first rotational element (first element) RE1 in FIG. 1. The vertical line Y3 indicates the relative rotational speed of the first ring gear R1 that is regarded as a third rotational element (third element) RE3 in FIG. 1. The intervals between the vertical lines Y1 and Y2, and between the vertical lines Y2 and Y3 are set based on the gear ratio ρ1 of the first planetary gear unit 24. Further, the five vertical lines Y4, Y5, Y6, Y7, and Y8 indicate the relative rotational speeds of the rotational elements of the automatic shift portion 20. That is, the vertical line Y4 indicates the relative rotational speed of the second sun gear S2 and the third sun gear S3, which are connected to each other, and which are regarded as a fourth rotational element (fourth element) RE4 in FIG. 1. The vertical line Y5 indicates the relative rotational speed of the second carrier CA2 that is regarded as a fifth rotational element (fifth element) RE5 in FIG. 1. The vertical line Y6 indicates the relative rotational speed of the fourth ring gear R4 that is regarded as a sixth rotational element (sixth element) RE6 in FIG. 1. The vertical line Y7 indicates the relative rotational speed of the second ring gear R2, the third carrier CA3, and the fourth carrier CA4, which are connected to each other, and which are regarded as a seventh rotational element (seventh element) RE7 in FIG. 1. The vertical line Y8 indicates the relative rotational speed of the third ring gear R3 and the fourth sun gear S4, which are connected to each other, and which are regarded as an eighth rotational element (eighth element) RE8 in FIG. 1. The intervals between the vertical lines are set based on the gear ratios ρ2 of the second planetary gear unit 26, the gear ratio ρ3 of the third planetary gear unit 28, and the gear ratio ρ4 of the fourth planetary gear unit 30. In the collinear diagram, the interval between the sun gear and the carrier is set to indicate "1". The interval between the carrier and the ring gear is set to indicate the gear ratio ρ. That is, in the differential portion 11, the interval between the vertical lines Y1 and Y2 is set to indicate "1", and the interval between the vertical lines Y2 and Y3 is set to indicate the gear ratio ρ1. In the automatic shift portion 20, the interval between the sun gear and the carrier in each of the second planetary gear unit 26, the third planetary gear unit 28, and the fourth planetary gear unit 30 is set to indicate "1". The interval between the carrier and the ring gear in each of the second planetary gear unit 26, the third planetary gear unit 28, and the fourth planetary gear unit 30 is set to indicate the gear ratio ρ.

As shown in the collinear diagram in FIG. 3, in the power splint mechanism 16 (the differential portion 11) in the shift mechanism 10 in the embodiment, the first rotational element RE1 (the first carrier CA1) is connected to the input shaft 14, that is, the engine 8, and selectively connected to the second rotational element RE2 (the first sun gear S1) via the switching clutch C0. The second rotational element RE2 is connected to the first motor M1, and selectively connected to the case 12 via the switching brake B0. The third rotational element RE3 (the first ring gear R1) is connected to the transmitting member 18 and the second motor M2. Thus, the rotation of the input shaft 14 is transmitted (input) to the automatic shift portion 20 via the transmitting member 18. The oblique straight line L0 that passes through at the intersection of the lines Y2 and X2 indicates the relation between the rotational speed of the first sun gear S1 and the rotational speed of the first ring gear R1.

For example, the differential portion 11 may be placed in the CVT mode (differential mode) so that the first rotational element RE1 to the third rotational element RE3 can be rotated relative to each other, for example, at least the second rotational element RE2 and the third rotational element RE3 can be rotated at different speeds, by disengaging the switching clutch C0 and the switching brake B0. In this case, when the rotational speed of the first sun gear S1 is increased or decreased by controlling the rotational speed of the first motor M1, and the rotational speed of the first ring gear R1 is substantially constant, the rotational speed of the first carrier CA1, that is, the engine speed $N_E$ is increased or decreased. The rotational speed of the first sun gear S1 is indicated by the intersection of the straight line L0 and the vertical line Y1. The rotational speed of the first ring gear R1 is indicated by the intersection of the straight line L0 and the vertical line Y3, and depends on a vehicle speed V. The rotational speed of the first carrier CA1 is indicated by the intersection of the straight line L0 and the vertical line Y2.

When the first sun gear S1 is connected to the first carrier CA1 by engaging the switching clutch C0, the power split mechanism 16 is placed in the non-differential mode in which the three rotational elements RE1, RE2, and RE3 of the power split mechanism 16 are integrally rotated, and the second rotational element RE2 and the third rotational element RE3 are rotated at the same speed. Therefore, the straight line L0 matches the horizontal line X2. That is, the transmitting member 18 is rotated at the same speed as the engine speed $N_E$. When the first sun gear S1 is connected to the case 12 by engaging the switching brake B0, the power split mechanism 16 is placed in the stepped shift mode in which the rotation of the second rotational element RE2 is stopped, and the second rotational element RE2 and the third rotational element RE3 are rotated at the same speed. Therefore, the straight line L0 extends as shown in FIG. 3. As a result, the differential portion 11 functions as the speed-increasing mechanism. That is, the rotational speed of the first ring gear R1, that is, the rotational speed of the transmitting member 18, which is higher than the engine speed $N_E$, is input to the automatic shift portion 20. The rotational speed of the first ring gear R1 is indicated by the intersection of the straight line L0 and the vertical line Y3.

In the automatic shift portion 20, the fourth rotational element RE4 is selectively connected to the transmitting member 18 via the second clutch C2, and selectively connected to the case 12 via the first brake B1. The fifth rotational element RE5 is selectively connected to the case 12 via the second brake B2. The sixth rotational element RE6 is selectively connected to the case 12 via the third brake B3. The seventh rotational element RE7 is connected to the output shaft 22. The eighth rotational element RE8 is selectively connected to the transmitting member 18 via the first clutch C1.

As shown in FIG. 3, in the automatic shift portion 20, the rotational speed of the output shaft 22 at the first gear is indicated by the intersection of the oblique straight line L1 and the vertical line Y7. The straight line L1 is set by engaging the first clutch C1 and the third brake B3. The straight line L1 passes through the intersection of the vertical line Y8 that indicates the rotational speed of the eighth rotational element RE8, and the horizontal line X2, and the intersection of the vertical line Y6 that indicates the rotational speed of the sixth rotational element RE6 and the horizontal line X1. The vertical line Y7 indicates the rotational speed of the seventh rotational element RE7 connected to the output shaft 22. Similarly, the rotational speed of the output shaft 22 at the second gear is indicated by the intersection of the oblique straight line L2 and the vertical line Y7. The straight line L2 is set by engaging the first clutch C1 and the second brake B2. The rotational speed of the output shaft 22 at the third gear is indicated by the intersection of the oblique straight line L3 and the vertical line Y7. The straight line L3 is set by engaging the first clutch C1 and the first brake B1. The rotational speed of the output shaft 22 at the fourth gear is indicated by the intersection of the horizontal straight line L4 and the vertical line Y7. The straight line L4 is set by engaging the first clutch C1 and the second clutch C2. At the first gear to the fourth gear, the switching clutch C0 is engaged. Thus, the power is input from the differential portion 11, that is, the power split mechanism 16 to the eighth rotational element RE8 such that the rotational speed of the eighth rotational element RE8 is the same as the engine speed $N_E$. When the switching brake B0 is engaged instead of the switching clutch C0, the power is input from the differential portion 11 to the eighth rotational element RE8 such that the rotational speed of the eighth rotational element RE8 is higher than the engine speed $N_E$. Thus, the rotational speed of the output shaft 22 at the fifth gear is indicated by the intersection of the horizontal straight line L5 and the vertical line Y7. The straight line L5 is set by engaging the first clutch C1, the second clutch C2, and the switching brake B0.

Figure 4:
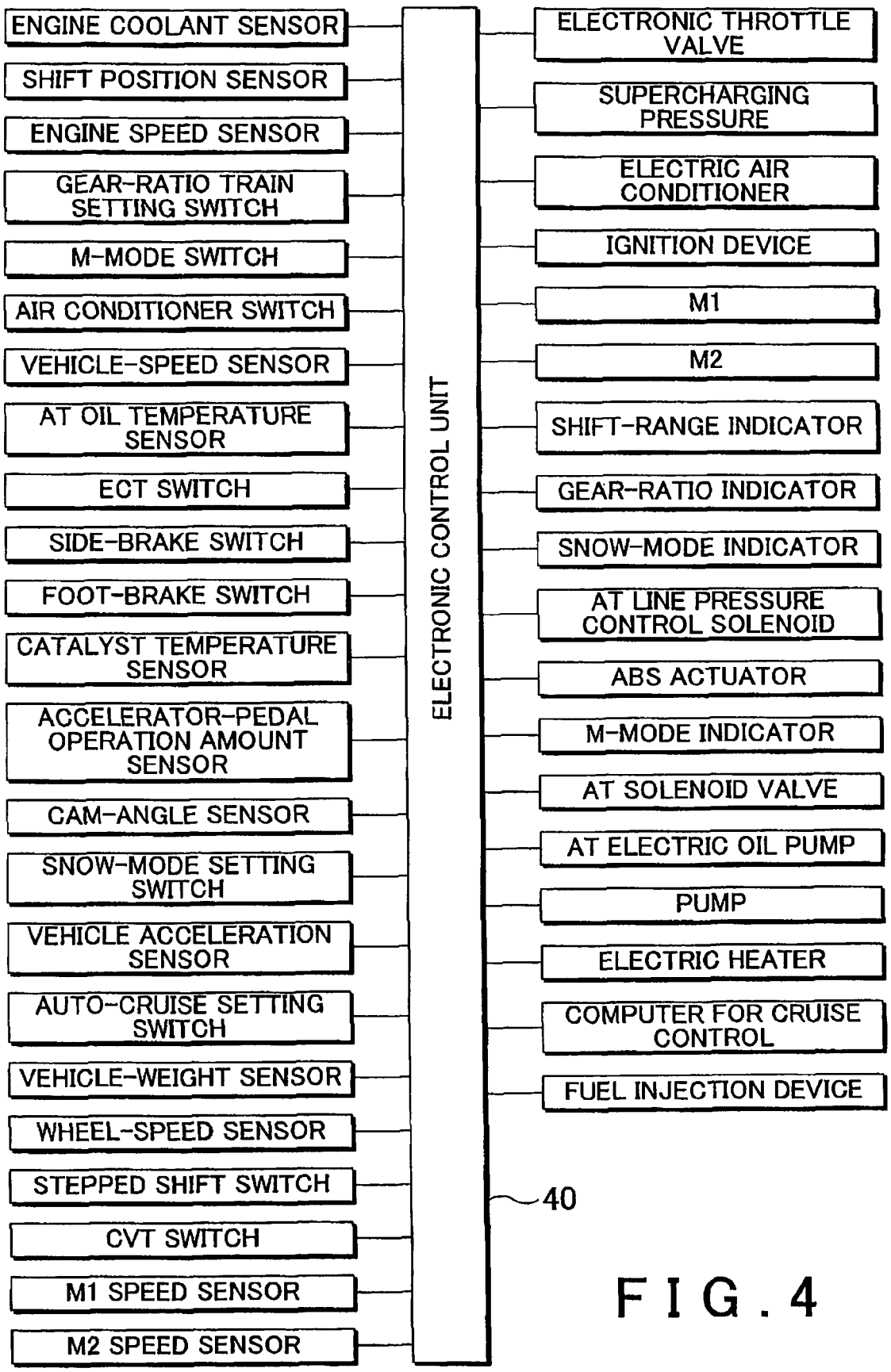
FIG. 4 is a diagram explaining signals input to and output from an electronic control unit provided in the drive apparatus according to the embodiment in FIG. 1.

FIG. 4 shows signals that are input to an electronic control unit 40, and signals that are output from the electronic control unit 40 to control the shift mechanism 10 in the embodiment. The electronic control unit 40 includes a so-called microcomputer that includes a CPU, ROM, RAM, and an input/output interface. The electronic control unit 40 executes a hybrid drive control relating to the engine 8, and the first and second motors M1 and M2, and a drive control including a shift control for the automatic shift portion 20, by processing the signals according to programs that are prestored in the ROM, using the temporary storage function of the RAM.

The electronic control unit 40 receives the signals from sensors and switches shown in FIG. 4. That is, the electronic control unit 40 receives a signal indicating an engine coolant temperature $TEMP_W$, a signal indicating a shift position $P_{SH}$, a signal indicating the engine speed $N_E$ of the engine 8, a signal indicating a gear-ratio train set value, a signal providing an instruction for a manual mode (M-mode), a signal indicating the operation of an air conditioner, a signal indicating the vehicle speed V which depends on the rotational speed $N_{OUT}$ of the output shaft 22, a signal indicating the temperature of hydraulic oil in the automatic shift portion 20, a signal indicating the operation of an emergency brake, a signal indicating the operation of a foot brake, a signal indicating a catalyst temperature, a signal indicating the operation amount of an accelerator pedal (i.e., an accelerator-pedal operation amount Acc) which depends on the amount of output required by a driver, a signal indicating a cam angle, a signal indicating the setting of a snow mode, a signal indicating longitudinal acceleration G, a signal indicating an auto-cruise mode, a signal indicating the weight of the vehicle, a signal indicating the wheel speed of each wheel, a signal indicating whether a stepped shift switch is operated to place the differential portion 11 (the power split mechanism 16) in the stepped shift mode (the locked mode) so that the shift mechanism 10 functions as the stepped transmission, a signal indicating whether a CVT switch is operated to place the differential portion 11 (the power split mechanism 16) in the CVT mode (the differential mode) so that the shift mechanism 10 functions as the CVT, a signal indicating the rotational speed $N_{M1}$ of the first motor M1 (hereinafter, referred to as "first-motor rotational speed $N_{M1}$"), a signal indicating the rotational speed $N_{M2}$ of the second motor M2 (hereinafter, referred to as "second-motor rotational speed $N_{M2}$", a signal indicating the state of charge SOC in an electric power storage device 60 (refer to FIG. 6), and the like.

The electronic control unit 40 outputs control signals to an engine output control device 43 (refer to FIG. 6) that controls the output from the engine 8. For example, the electronic control unit 40 outputs a drive signal to a throttle actuator 97 to control the throttle-valve opening amount $\theta_{TH}$ of an electronic throttle valve 96 provided in the intake pipe 95 of the engine 8, a fuel-supply amount signal that controls the amount of fuel supplied by a fuel injection device 98 to the intake pipe 95 or the cylinder of the engine 8, and an ignition signal that provides an instruction for the timing at which an ignition device 99 ignites the fuel in the engine 8. The electronic control unit 40 also outputs a supercharging-pressure adjustment signal that adjusts supercharging pressure, an electric air-conditioner drive signal that operates the electric air conditioner, an instruction signal that provides an instruction for the operation of the motors M1 and M2, a shift position (operational position) indication signal that operates a shift indicator, a gear-ratio indication signal that causes a gear-ratio indicator to indicate the gear ratio, a snow-mode indication signal that causes a snow-mode indicator to indicate that the snow mode is selected, an ABS operation signal that operates an ABS (anti-locking braking system) actuator that prevents the slip of the wheels at the time of braking, a M-mode indication signal that causes a M-mode indicator to indicate that the M-mode is selected, a valve-instruction signal that operates electromagnetic valves in a hydraulic control circuit 42 (refer to FIG. 5 and FIG. 6) to control hydraulic actuators for the hydraulic frictional engagement devices in the differential portion 11 and the automatic shift portion 20, a drive instruction signal that operates an electric hydraulic pump for supplying a hydraulic pressure that is used as a basic pressure when a line pressure $P_L$ is regulated using a regulator valve provided in the hydraulic control circuit 42, a signal that drives an electric heater, a signal for a computer used for the cruise control, and the like.

Figure 5:
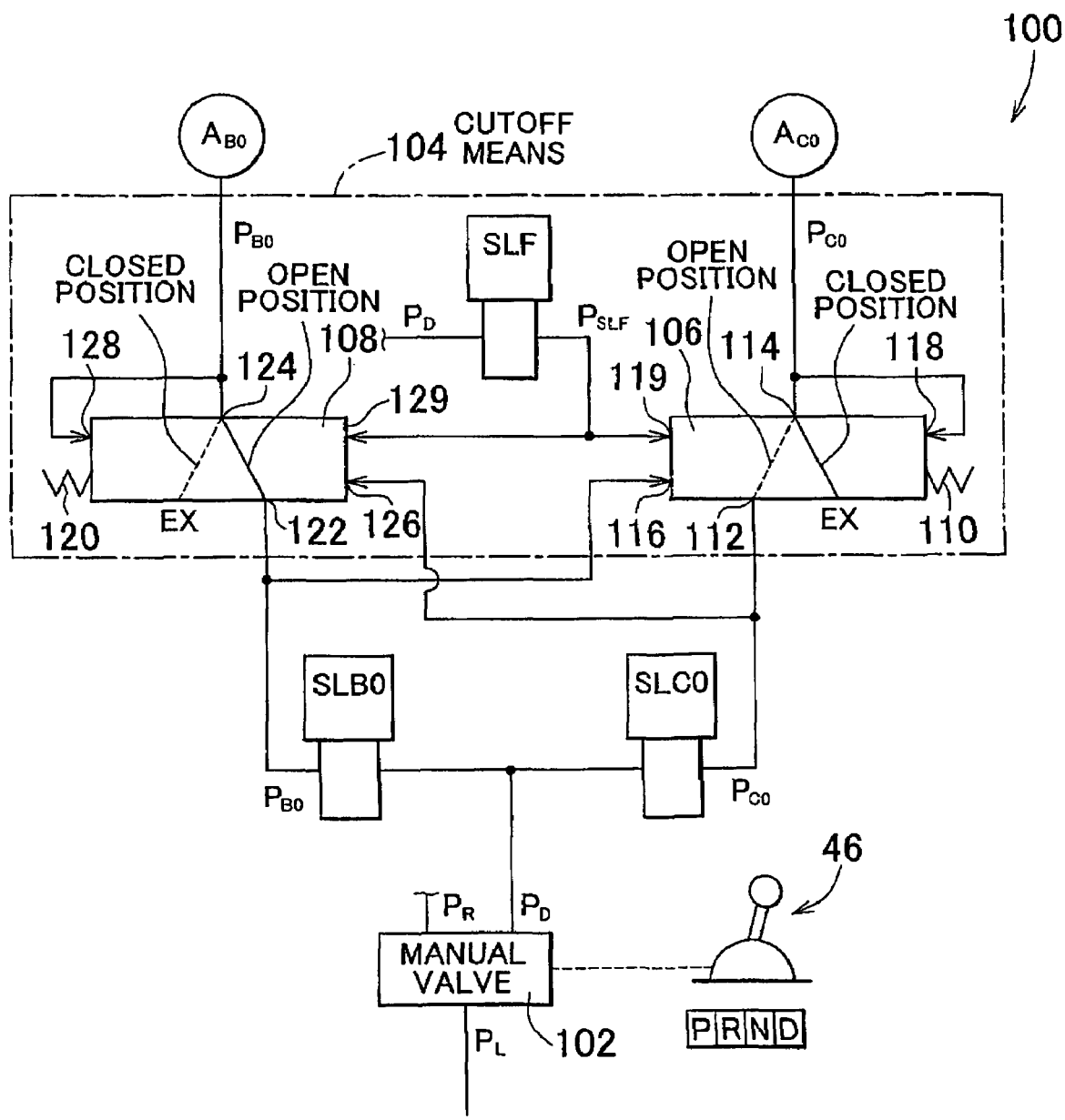
FIG. 5 is a diagram showing a hydraulic circuit which relates to the operations of hydraulic actuators for a switching clutch and a switching brake, and which constitutes a part of a hydraulic control circuit.

FIG. 5 shows a hydraulic circuit 100 relating to the operations of hydraulic actuators (hydraulic cylinders) $A_{C0}$ and $A_{B0}$ for the switching clutch C0 and the switching brake B0, respectively. The hydraulic circuit 100 constitutes a part of the hydraulic control circuit 42. In FIG. 5, the hydraulic circuit 100 includes a manual valve 102, a linear solenoid valve SLC0, a linear solenoid valve SLB0, and cutoff means 104. The manual valve 102 is mechanically operated to select an oil passage according to the operation of a shift lever 46 that is mechanically connected to the manual valve 102 via a cable, a link, or the like. Thus, when the shift lever 46 is moved to the position "D", the input line pressure $P_L$ is output as a D-range pressure $P_D$, and when the shift lever 46 is moved to the position "R", the input line pressure $P_L$ is output as a reverse pressure PR. The linear solenoid valve SLC0 regulates an engagement hydraulic pressure $P_{C0}$ using the D-range pressure $P_D$ as the basic pressure, and supplies the engagement hydraulic pressure $P_{C0}$ to the hydraulic actuator $A_{C0}$. The engagement hydraulic pressure $P_{C0}$ engages the switching clutch C0. The engagement hydraulic pressure $P_{C0}$ is regarded as the first hydraulic pressure. The linear solenoid valve SLB0 regulates an engagement hydraulic pressure $P_{B0}$ using the D-range pressure $P_D$ as the basic pressure, and supplies the engagement hydraulic pressure $P_{B0}$ to the hydraulic actuator $A_{B0}$. The engagement hydraulic pressure $P_{B0}$ engages the switching brake B0. The engagement hydraulic pressure $P_{B0}$ is regarded as the second hydraulic pressure. When the vehicle condition is in a region where the differential action of the differential portion 11 should be limited, the cutoff means 104 permits the switching clutch C0 or the switching brake B0 to limit the differential action. When the vehicle condition is in a region where the limitation of the differential action of the differential portion 11 should be stopped, the cutoff means 104 prohibits the switching clutch C0 and the switching brake B0 from limiting the differential action. That is, the mode of the cutoff means 104 is selectively switched between a permission mode for permitting the switching clutch C0 or the switching brake B0 to limit the differential action, and a prohibition mode for prohibiting the switching clutch C and the switching brake B0 from limiting the differential action.

The cutoff means 104 includes a first switching valve 106, a second switching valve 108, and a solenoid valve SLF. The first switching valve 106 is provided to selectively switch the mode of the cutoff means 104 between the permission mode for permitting the switching clutch C0 to limit the differential action, and the prohibition mode for prohibiting the switching clutch C0 from limiting the differential action. The first switching valve 106 is maintained in an open state to allow supply of the engagement hydraulic pressure $P_{C0}$ to the switching clutch C0 (the hydraulic actuator $A_{C0}$). When the engagement hydraulic pressure $P_{B0}$ is input to the first switching valve 106, the first switching valve 106 is placed in a closed state to interrupt the supply of the engagement hydraulic pressure $P_{C0}$. The second switching valve 108 is provided to selectively switch the mode of the cutoff means 104 between the permission mode for permitting the switching brake B0 to limit the differential action, and the prohibition mode for prohibiting the switching brake B0 from limiting the differential action. The second switching valve 108 is maintained in an open state to allow supply of the engagement hydraulic pressure $P_{B0}$ to the switching brake B0 (the hydraulic actuator $A_{B0}$). When the engagement hydraulic pressure $P_{C0}$ is input to the second switching valve 108, the second switching valve 108 is placed in a closed state to interrupt the supply of the engagement hydraulic pressure $P_{B0}$. The solenoid valve SLF supplies a signal pressure $P_{SLF}$ to the first switching valve 106 and the second switching valve 108, using the D-range pressure $P_D$ as the basic pressure. The signal pressure $P_{SLF}$ places both of the first switching valve 106 and the second switching valve 108 in the closed state. The signal pressure $P_{SLF}$ is regarded as the third hydraulic pressure. The solenoid valve SLF is regarded as the third-hydraulic pressure generation device.

In the first switching valve 106, a spool valve element (not shown) is usually maintained in an open position by the urging force of a spring 110 to permit the engagement hydraulic pressure $P_{C0}$ input to an input port 112 to be supplied to the switching clutch C0 via an output port 114. When the engagement hydraulic pressure $P_{B0}$ is input to an oil chamber 116, the thrust force, which resists the urging force of the spring 110, is applied to the spool valve element, and the spool valve element is placed in the closed position. As a result, the supply of the engagement hydraulic pressure $P_{C0}$ to the switching clutch C0 is interrupted. Also, communication is provided between the output port 114 and an atmospheric pressure port EX, and the hydraulic pressure (hydraulic oil) supplied to the hydraulic actuator $A_{C0}$ is discharged. When the spool valve element is maintained in the open position, and the engagement hydraulic pressure $P_{C0}$ is supplied to the switching clutch C0, the engagement hydraulic pressure $P_{C0}$ output from the output port 114 is supplied to an oil chamber 118 as well as to the switching clutch C0, and the thrust force is applied to urge the spool valve element to the open position. In this situation, even if the engagement hydraulic pressure $P_{B0}$ is input to the oil chamber 116, the spool valve element is maintained in the open position. When the signal pressure $P_{SLF}$ is input to the oil chamber 119, the spool valve element is placed in the closed position to interrupt the supply of the engagement hydraulic pressure $P_{C0}$ to the switching clutch C0, regardless of whether the engagement hydraulic pressure $P_{C0}$ is input to the oil chamber 118.

In the second switching valve 108, a spool valve element (not shown) is maintained in an open position by the urging force of a spring 120 to permit the engagement hydraulic pressure $P_{B0}$ input to an input port 122 to be supplied to the switching brake B0 via an output port 124. When the engagement hydraulic pressure $P_{C0}$ is input to an oil chamber 126, the thrust force, which resists the urging force of the spring 120, is applied to the spool valve element, and the spool valve element is placed in the closed position. As a result, the supply of the engagement hydraulic pressure $P_{B0}$ to the switching brake B0 is interrupted. Also, communication is provided between the output port 124 and an atmospheric pressure port EX, and the hydraulic pressure (hydraulic oil) supplied to the hydraulic actuator $A_{B0}$ is discharged. When the spool valve element is maintained in the open position, and the engagement hydraulic pressure $P_{B0}$ is supplied to the switching brake B0, the engagement hydraulic pressure $P_{B0}$ output from the output port 124 is supplied to an oil chamber 128 as well as to the switching brake B0, and the thrust force is applied to urge the spool valve element to the open position. In this situation, even if the engagement hydraulic pressure $P_{C0}$ is input to the oil chamber 126, the spool valve element is maintained in the open position. When the signal pressure $P_{SLF}$ is input to the oil chamber 129, the spool valve element is placed in the closed position to interrupt the supply of the engagement hydraulic pressure $P_{B0}$ to the switching brake B0, regardless of whether the engagement hydraulic pressure $P_{B0}$ is input to the oil chamber 128.

In the cutoff means 104 having the above-described configuration, if the engagement hydraulic pressure $P_{C0}$ is output when the first switching valve 106 is in the open state, the engagement hydraulic pressure $P_{C0}$ is supplied to the switching clutch C0, and the switching clutch C0 is engaged. Also, the first switching valve 106 is maintained in the open position, and the second switching valve 108 is placed in the closed state. Even if the engagement hydraulic pressure $P_{B0}$ is supplied at this time, the first switching valve 106 is maintained in the open state, and the engagement hydraulic pressure $P_{B0}$ is not supplied to the switching brake B0. Thus, the switching brake B0 is not engaged.

In the cutoff means 104, if the engagement hydraulic pressure $P_{B0}$ is output when the second switching valve 108 is in the open state, the engagement hydraulic pressure $P_{B0}$ is supplied to the switching brake B0, and the switching brake B0 is engaged. Also, the second switching valve 108 is maintained in the open position, and the first switching valve 106 is placed in the closed state. Even if the engagement hydraulic pressure $P_{C0}$ is supplied at this time, the second switching valve 108 is maintained in the open state, and the engagement hydraulic pressure $P_{C0}$ is not supplied to the switching clutch C0. Thus, the switching clutch C0 is not engaged.

In the cutoff means 104, when the signal pressure $P_{SLF}$ is output from the solenoid valve SLF, both of the first switching valve 106 and the second switching valve 108 are placed in the closed state. Thus, the cutoff means 104 is placed in the prohibition mode for prohibiting the limitation of the differential action of the differential portion 11. As a result, both of the switching clutch C0 and the switching brake B0 are disengaged. When the signal pressure $P_{SLF}$ is not output from the solenoid valve SLF, the first switching valve 106 is closed based on the engagement hydraulic pressure $P_{B0}$, or the second switching valve 108 is closed based on the engagement hydraulic pressure $P_{C0}$. Thus, the cutoff means 104 is placed in the permission mode for permitting the limitation of the differential action of the differential portion 11. For example, if the switching clutch C0 or the switching brake B0 may be engaged, and therefore the differential action may be limited due to a failure when the vehicle condition is in the region where the limitation of the differential action of the differential portion 11 should be stopped, the solenoid valve SLF outputs the signal pressure $P_{SLF}$. Thus, the fail-safe function is performed to prohibit the limitation of the differential action. This avoids the situation where fuel efficiency is decreased, driveability is deteriorated, and a shock is caused by limiting the differential action.

Thus, in the cutoff means 104, the oil passages are configured such that, when one of the first switching valve 106 and the second switching valve 108 is maintained in the open state, the other of the first switching valve 106 and the second switching valve 108 is maintained in the closed state based on the engagement hydraulic pressure $P_{C0}$ and the engagement hydraulic pressure $P_{B0}$. That is, the first switching valve 106 and the second switching valve 108 constitute a fail safe circuit that prevents the switching clutch C0 and the switching brake B0 from being simultaneously engaged.

In the cutoff means 104, the oil passages are configured such that, when the vehicle condition is in the region where the limitation of the differential action of the differential portion 11 should be stopped, both of the first switching valve 106 and the second switching valve 108 are maintained in the closed state by supplying the signal pressure $P_{SLF}$. Thus, the both of the switching clutch C0 and the switching brake B0 are disengaged. That is, in the cutoff means 104 in the embodiment, the first switching valve 106 and the second switching valve 108 constitute the fail safe circuit that prevents the switching clutch C0 and the switching brake B0 from being simultaneously engaged. In addition, the first switching valve 106 and the second switching valve 108 have the cutoff function that disengages both of the switching clutch C0 and the switching brake B0. Thus, it is not necessary to provide, for example, a valve device used only for disengaging both of the switching clutch C0 and the switching brake B0. This suppresses increases in the cost and the required space. The region where the differential action of the differential portion 11 should be limited, and the region where the limitation of the differential action of the differential portion 11 should be stopped, will be described in detail later.

Figure 6:
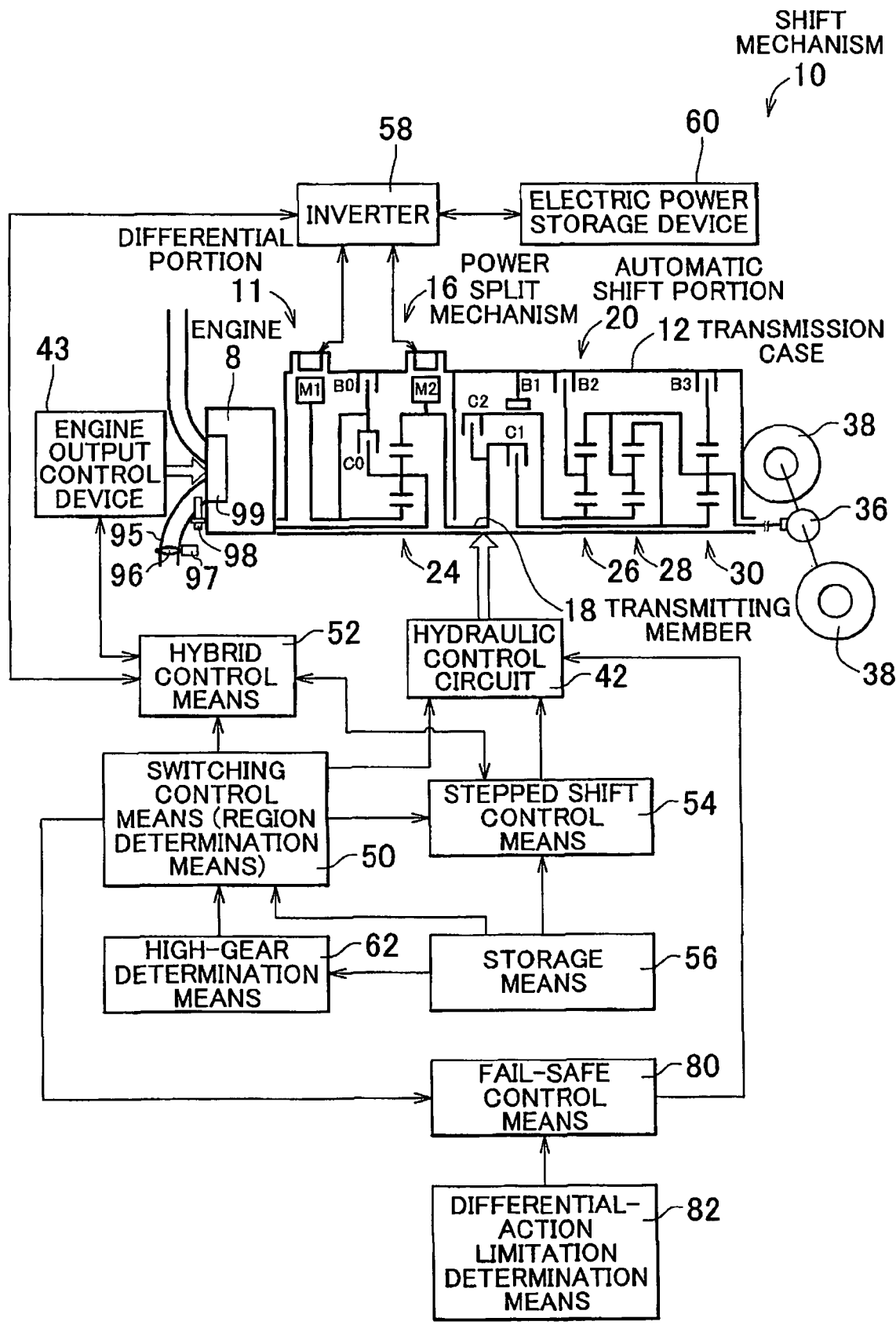
FIG. 6 is a function block diagram explaining the main part of the control operation performed by the electronic control unit in FIG. 4.

FIG. 6 is a function block diagram explaining the main part of the control functions of the electronic control unit 40. In FIG. 6, stepped shift control means 54 determines whether the shift mechanism 10 should shift, based on the vehicle condition indicated by the vehicle speed V and a required torque $T_{OUT}$-output from the automatic shift portion 20, using a shift diagram (i.e., a shift relation, or a shift map) indicated by solid lines and chain lines in FIG. 7. The shift diagram is prestored, for example, in storage means 56. For example, the stepped shift control means 54 determines the gear to which the automatic shift portion 20 should shift, based on the vehicle condition, using the shift diagram. Then, the stepped shift control means 54 executes an automatic shift control so that the automatic shift portion 20 shifts to the selected gear. At this time, the stepped shift control means 54 provides the instruction (i.e., a shift output instruction, or a hydraulic pressure instruction) to the hydraulic control circuit 42 to engage and/or disengage the hydraulic frictional engagement devices relating to the shift of the automatic shift portion 20, except the switching clutch C0 and the switching brake B0, according to, for example, the engagement operation table shown in FIG. 2 so that the automatic shift portion 20 shifts to the selected gear. That is, the stepped shift control means 54 outputs the instruction to the hydraulic control circuit 42 to disengage the disengagement-side engagement device relating to the shift of the automatic shift portion 20, and to engage the engagement-side engagement device relating to the shift of the automatic shift portion 20, thereby performing the clutch-to-clutch shift. According to the instruction, for example, the hydraulic control circuit 42 operates the hydraulic actuators for the hydraulic frictional engagement devices relating to the shift by operating the electromagnetic valves in the hydraulic control circuit 42. Thus, the disengagement-side engagement device relating to the shift is disengaged, and the engagement-side engagement device relating to the shift is engaged so that the automatic shift portion 20 shifts to the selected gear.

Hybrid control means 52 functions as CVT control means. When the shift mechanism 10 is in the CVT mode, that is, the differential portion 11 is in the differential mode, the hybrid control means 52 operates the engine 8 efficiently, and controls the speed ratio γ0 of the differential portion 11 that functions as the electric CVT, by optimizing the ratio of the driving power provided by the engine 8 and the driving power provided by the second motor M2, and the reaction force borne by the first motor M1 while the first motor M1 generates electric power. For example, the hybrid control means 52 calculates a target (required) output for driving the vehicle based on the accelerator-pedal operation amount Acc, which indicates the amount of output required by the driver, and the vehicle speed V; calculates a total target output based on the target output for driving the vehicle and a required output for charging the electric power storage device 60; calculates a target engine output so that the total target output can be obtained, taking into account a transfer loss, loads of auxiliary machines, an assist torque provided by the second motor M2, and the like; and controls the engine speed $N_E$ and the engine torque $T_E$ of the engine 8 to obtain the engine output that matches the target engine output, and controls the amount of electric power generated by the first motor M1.

Figure 8:
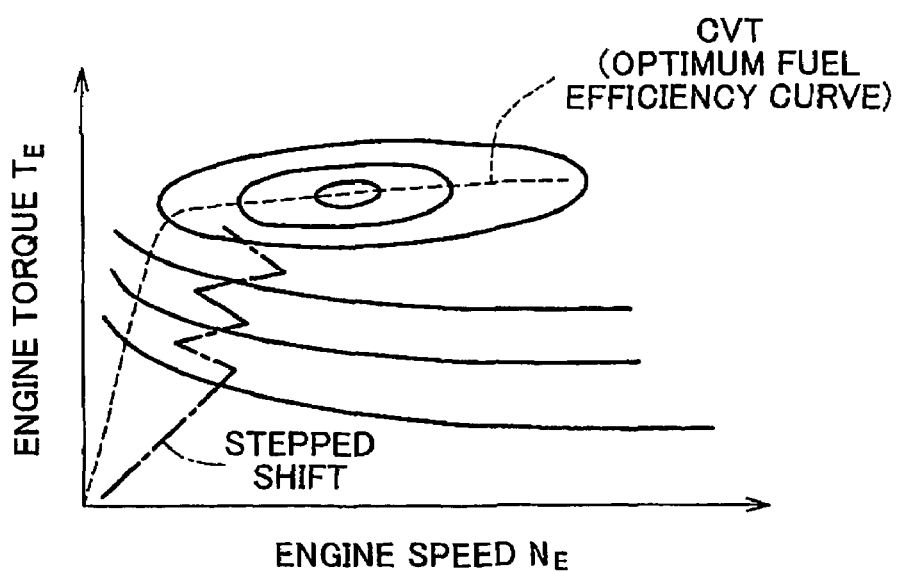
FIG. 8 shows an example of a fuel efficiency map where a dash line is an optimum fuel efficiency curve for an engine, and explains a difference between the operation of the engine when a CVT is used, which is indicated by a dash line, and the operation of the engine when a stepped transmission is used, which is indicated by a chain line.

The hybrid control means 52 executes the hybrid control to improve the power performance, and the fuel efficiency, taking into account the gear of the automatic shift portion 20. During this hybrid control, the differential portion 11 functions as the electric CVT to coordinate the engine speed $N_E$ and the vehicle speed V, which are set to operate the engine 8 efficiently, and the rotational speed of the transmitting member 18, which is set by the gear of the automatic shift portion 20. That is, the hybrid control means 52 sets the target value of the total speed ratio γT of the shift mechanism 10 so that the engine 8 operates according to an optimum fuel efficiency curve (i.e., a fuel efficiency map, a relational diagram) as indicated by the dash line in FIG. 8. The optimum fuel efficiency curve is empirically obtained in advance in a two-dimension coordinate constituted by the engine speed $N_E$ and the torque $T_E$ output from the engine 8 (i.e., engine torque $T_E$) so that high drivability and high fuel efficiency are achieved when the vehicle is driven in the CVT mode. The optimum fuel efficiency curve is stored in, for example, the storage means. For example, the hybrid control means 52 sets the target value of the total speed ratio γT of the shift mechanism 10 to control the engine torque $T_E$ and the engine speed $N_E$ to obtain the engine output that matches the target output (i.e., the total target output, or the required driving power). Then, the hybrid control means 52 controls the speed ratio γ0 of the differential portion 11, taking into the account the gear of the automatic shift portion 20, thereby controlling the total speed ratio γT in a range in which the total speed ratio γT can be changed, for example, the range of 13 to 0.5.

At this time, the hybrid control means 52 supplies the electric energy generated by the first motor M1 to the electric power storage device 60 and the second motor M2 through an inverter 58. Therefore, although the main part of the power output from the engine 8 is mechanically transmitted to the transmitting member 18, part of the power output from the engine 8 is consumed by the first motor M1 to generate electric power. That is, part of the power output from the engine 8 is converted to electric energy in the first motor M1. The electric energy is supplied to the second motor M2 through the inverter 58, and the second motor M2 is driven. Thus, mechanical energy is transmitted from the second motor M2 to the transmitting member 18. The devices related to the process from the generation of the electric power to the consumption of the electric power in the second motor M2 constitute an electric path in which part of the power output from the engine 8 is converted to the electric energy, and the electric energy is converted to the mechanical energy.

The hybrid control means 52 can maintain the engine speed $N_E$ at a substantially constant value, or control the engine speed $N_E$ to any given value by using the electric CVT function of the differential portion 11, and by controlling the first-motor rotational speed $N_{M1}$ and/or the second-motor rotational speed $N_{M2}$, regardless of whether the vehicle is stopped or driven. In other words, the hybrid control means 52 can control the first-motor rotational speed $N_{M1}$ and/or the second-motor rotational speed $N_{M2}$ to any given value(s), while maintaining the engine speed $N_E$ at a substantially constant value, or controlling the engine speed $N_E$ to any given value.

For example, as shown in the collinear diagram in FIG. 3, when the engine speed $N_E$ needs to be increased while the vehicle is driven, the hybrid control means 52 increases the first-motor rotational speed $N_{M1}$ while maintaining the second-motor rotational speed $N_{M2}$, which depends on the vehicle speed V (the rotational speed of the driving wheels 38), to a substantially constant value. When the engine speed $N_E$ needs to be maintained at a substantially constant value during the shift of the automatic shift portion 20, the hybrid control means 52 increases the first-motor rotational speed $N_{M1}$ if the second-motor rotational speed $N_{M2}$ is decreased by the shift of the automatic shift portion 20, and decreases the first-motor rotational speed $N_{M1}$ if the second-motor rotational speed $N_{M2}$ is increased by the shift of the automatic shift portion 20, while maintaining the engine speed $N_E$ at a substantially constant value.

Also, the hybrid control means 52 functionally includes engine output control means for executing an output control for the engine 8 so that the engine 8 generates the required output, by outputting at least one of the instruction for controlling opening/closing of the electronic throttle valve 96 using the throttle actuator 97, the instruction for the amount of fuel injected by the fuel injection device 98, and the injection timing, and the instruction for controlling the timing at which the fuel is ignited by the ignition device 99 such as the igniter, to the engine output control device 43. For example, the hybrid control means 52 basically executes a throttle control to drive the throttle actuator 60 based on the accelerator-pedal operation amount Acc according to a prestored relation (not shown). That is, the hybrid control means 52 basically executes the throttle control to increase the throttle-valve opening amount $\theta_{TH}$ as the accelerator-pedal operation amount Acc increases. The engine output control device 43 controls the engine torque, for example, by controlling the opening/closing of the electronic throttle valve 96 using the throttle actuator 97, controlling the fuel injection performed by the fuel injection device 98, and controlling the timing at which the fuel is ignited by the ignition device 99 such as the igniter.

Figure 7:
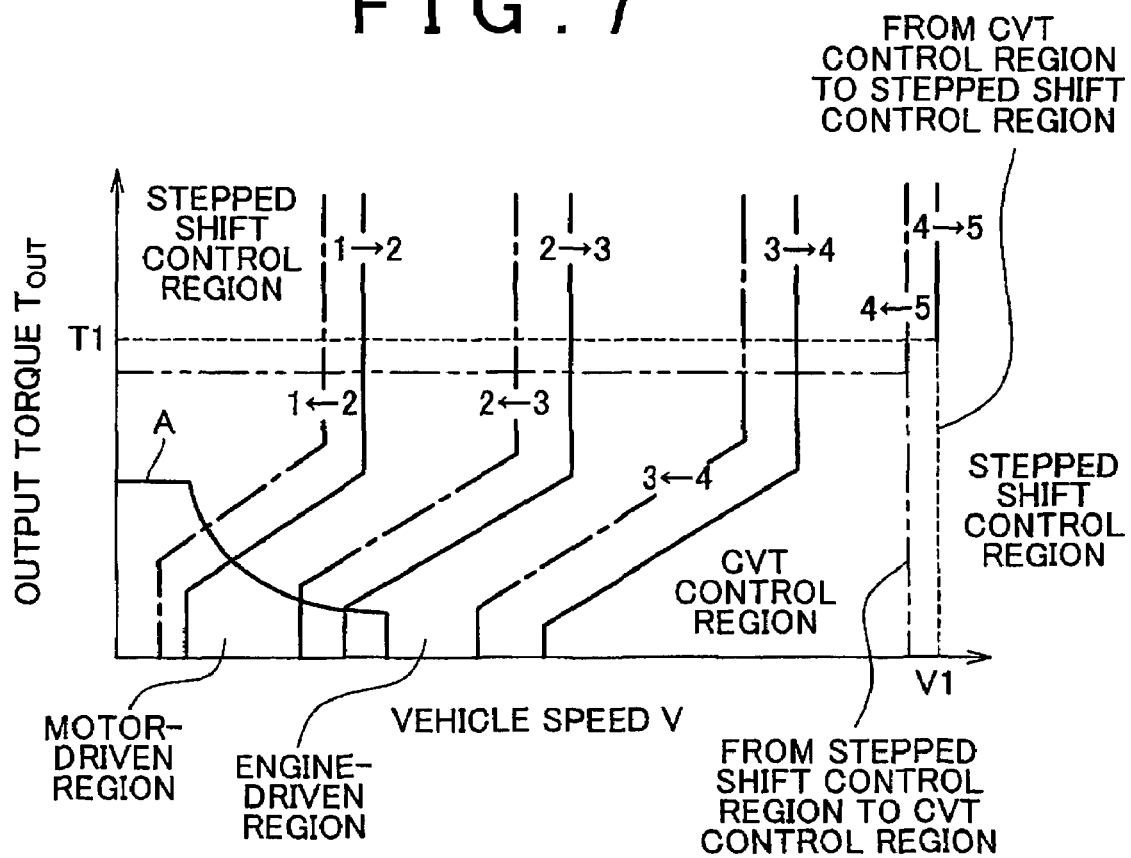
FIG. 7 shows an example of a prestored shift diagram in which a vehicle speed and output torque are used as parameters in a two-dimension coordinate, and which is used to determine the gear to which an automatic shift portion should shift, an example of a prestored switching diagram that is used to determine the shift mode in which a shift mechanism should be placed, and an example of a prestored driving power source switching diagram that includes a boundary line between an engine-driven region and a motor-driven region, which is used to switch a driven mode between an engine-driven mode and a motor-driven mode, FIG. 7 also showing the relation between the diagrams.

Also, the hybrid control means 52 can drive the vehicle in a motor-driven mode, using the electric CVT function (differential action) of the differential portion 1, regardless of whether the engine 8 is stopped or idling. For example, the solid line A in FIG. 7 is a boundary line between an engine-driven region and a motor-driven region. The boundary line is provided to switch the driving power source for starting and driving the vehicle between the engine 9 and the motor, for example, the second motor M2. In other words, the boundary line is provided to switch the driven mode between a so-called engine-driven mode and the motor-driven mode. In the engine-driven mode, the engine 8 is used as the driving power source for starting and driving the vehicle. In the motor-driven mode, the second motor M2 is used as the driving power source for starting and driving the vehicle. The prestored relational diagram shown in FIG. 7, which includes the boundary line provided to switch the driven mode between the engine-driven mode and the motor-driven mode, is one example of a driving power source switching diagram (driving power source map) where the vehicle speed V and the output torque $T_{OUT}$ related to the driving power are used as parameters in the two-dimension coordinate. For example, the driving power source switching diagram is prestored in the storage means 56, along with the shift diagram (shift map) indicated by the solid lines and chain lines in FIG. 7.

The hybrid control means 52 determines whether the vehicle condition is in the motor-driven region or the engine-driven region, based on the vehicle condition indicated by the vehicle speed V and the required output torque $T_{OUT}$, using the driving power source switching diagram shown in FIG. 7. Then, the hybrid control means 52 drives the vehicle in the motor-driven mode or the engine-driven mode. As shown in FIG. 7, the hybrid control means 52 drives the vehicle in the motor-driven mode in a low output torque $T_{OUT}$ region, that is, in a low engine torque $T_E$ region where the engine efficiency is lower than that in a high torque region. Ordinarily, the motor-driven mode is selected in priority to the engine-driven mode when the vehicle is started. However, when the accelerator pedal 45 is greatly operated such that the required output torque $T_{OUT}$, that is, the required engine torque $T_E$ exceeds the upper limit of the motor-driven region in the driving power source switching diagram in FIG. 7 at the time of start of the vehicle, the vehicle is started in the engine-driven mode.

When the vehicle is driven in the motor-driven mode, the hybrid control means 52 executes the control to suppress the drag of the engine 8 that is stopped, and to improve fuel efficiency. That is, when the vehicle is driven in the motor-driven mode, the hybrid control means 52 controls the first motor M1 so that the first-motor rotational speed $N_{M1}$ is a negative value, for example, the first motor M1 is idling, using the electric CVT function (differential action) of the differential portion 11, thereby maintaining the engine speed $N_E$ at zero or substantially zero using the differential action of the differential portion 11, as required.

Even when the vehicle is driven in the engine-driven mode, the hybrid control means 52 can perform a so-called torque-assist operation, by supplying the second motor M2 with the electric energy supplied from the first motor M1 via the electric path, and/or the electric energy supplied from the electric power storage device 60, and by driving the second motor M2 to apply torque to the driving wheels 38. Accordingly, when the vehicle is driven in the engine-driven mode, both of the engine 8 and the motor may be used as the driving power sources. When the vehicle is driven in the motor-driven mode, the torque assist operation may be performed by increasing the torque output from the second motor M2.

Also, the hybrid control means 52 can maintain the operating state of the engine 8 using the electric CVT function of the differential portion 11, regardless of whether the vehicle is stopped or driven at a low vehicle speed. For example, if the first motor M1 needs to generate electric power due to a decrease in the state of charge SOC of the electric power storage device 60 when the vehicle is stopped, the first motor M1 generates electric power using the power supplied from the engine 8, and the first-motor rotational speed $N_{M1}$ of the first motor M1 is increased. The second-motor rotational speed $N_{M2}$, which uniquely depends on the vehicle speed V, is zero (substantially zero) because the vehicle is stopped. Even in this situation, the engine speed $N_E$ is maintained at a speed equal to or higher than a speed at which the engine can astronomically operate, using the differential action of the power split mechanism 16.

Also, the hybrid control means 52 places the first motor M1 in a no-load state, by interrupting the flow of driving electric current that is supplied to the first motor M1 from the electric power storage device 60 via the inverter 58. When the first motor M1 is placed in the no-load state, the first motor M1 is permitted to idle, torque cannot be transmitted in the differential portion 11. That is, the power transmission path in the differential portion 11 is substantially blocked, and no output is generated from the differential portion 11. That is, the hybrid control means 52 places the differential portion 11 in the neutral state in which the power transmission path is electrically blocked, by placing the first motor M1 in the no-load state.

To determine which of the switching clutch C0 or the switching brake B0 should be engaged when the shift mechanism 10 is placed in the stepped shift mode, high-gear determination means 62 determines whether the shift mechanism 10 should shift to a high gear (e.g., the fifth gear), for example, based on the vehicle condition according to the shift diagram in FIG. 7 prestored in the storage means 56. Alternatively, the high-gear determination means 62 determines whether the shift mechanism 10 should shift to a high gear (e.g., the fifth gear) according to the determination made by the stepped shift control means 54.

The switching control means 50 selectively switches the mode of the shift mechanism 10 between the CVT mode and the stepped shift mode (i.e., between the differential mode and the locked mode), by engaging/disengaging the engagement devices (the switching clutch C0, and the switching brake B0) based on the vehicle condition. For example, the switching control means 50 determines the mode in which the shift mechanism 10 (the differential portion 11) should be placed, based on the vehicle condition indicated by the vehicle speed V and the required output torque $T_{OUT}$, using the switching diagram (i.e., the switching map, or the relational diagram) indicated by the dash lines and the two-dot chain lines in FIG. 7, which is prestored in the storage means 56. That is, the switching control means 50 determines whether the vehicle condition is in the CVT control region where the shift mechanism 10 should be placed in the CVT mode, or the vehicle condition is in the stepped shift control region where the shift mechanism 10 should be placed in the stepped shift mode. Then, the switching control means 50 selectively switches the mode of the shift mechanism 10 between the CVT mode and the stepped shift mode.

Thus, the switching control means 50 limits the differential action of the differential portion 11, or stops the limitation of the differential action of the differential portion 11 using the switching clutch C0 or the switching brake B0, by engaging/disengaging the switching clutch C0 or the switching brake B0 based on the vehicle condition. That is, the switching control means 50 functions as the differential-action limitation means for limiting, or stopping limiting the operation of the differential portion 11 that functions as the electric differential device (CVT). When the vehicle condition is in the stepped shift control region where the shift mechanism 10 should be placed in the stepped shift mode, the vehicle condition is in the region where the differential action of the differential portion 11 should be limited. When the vehicle condition is in the CVT control region where the shift mechanism 10 should be placed in the CVT mode, the vehicle condition is in the region where the limitation of the differential action of the differential portion 11 should be stopped. Thus, the switching control means 50 functions as region determination means for determining whether the vehicle condition is in the region where the limitation of the differential action of the differential portion 11 should be stopped. That is, the switching control means 50 functions as region determination means for determining whether the vehicle condition is in the CVT control region.

More specifically, when the switching control means 50 determines that the vehicle condition is in the stepped shift control region, the switching control means 50 outputs, to the hybrid control means 52, a signal that does not permit, that is, prohibits the hybrid control or the CVT control. Also, the switching control means 50 permits the stepped shift control means 54 to shift the automatic shift portion 20 in the predetermined manner in the stepped shift mode. That is, the stepped shift control means 54 executes the automatic shift control for the automatic shift portion 20 according to, for example, the shift diagram shown in FIG. 7 prestored in the storage means 56. For example, the entire shift mechanism 10 (i.e., the differential portion 11 and the automatic shift portion 20) functions as the so-called stepped transmission, and the gear is selected according to the engagement operation table shown in FIG. 2.

For example, when the high-gear determination means 62 determines that the shift mechanism 10 should shift to the fifth gear, the switching control means 50 outputs, to the hydraulic control circuit 42, the instruction for disengaging the switching clutch C0 and engaging the switching brake B0, that is, the instruction for stopping the output of the engagement hydraulic pressure $P_{C0}$ from the linear solenoid valve SLC0, and outputting the engagement hydraulic pressure $P_{B0}$ from the linear solenoid valve SLB0 so that the differential portion 11 functions as a sub-transmission in which the speed ratio γ0 is fixed (for example, the speed ratio γ0 is 0.7), and the entire shift mechanism 10 shifts to the high gear at which the speed ratio is smaller than 1.0, that is, a so-called over drive gear. When the high-gear determination means 62 determines that the shift mechanism 10 should not shift to the fifth gear, the switching control means 50 outputs, to the hydraulic control circuit 42, the instruction for engaging the switching clutch C0 and disengaging the switching brake B0, that is, the instruction for outputting the engagement hydraulic pressure $P_{C0}$ from the linear solenoid valve SLC0, and stopping the output of the engagement hydraulic pressure $P_{B0}$ from the linear solenoid valve SLB0 so that the differential portion 11 functions as a sub-transmission in which the speed ratio γ0 is fixed (for example, the speed ratio γ0 is 1), and the entire shift mechanism 10 shifts to one of low gears at which the speed ratio is equal to or higher than 1.0. Thus, the switching control means 50 places the shift mechanism 10 in the stepped shift mode, and selectively switches the gear of the shift mechanism 10 between the two types of gears, that is, the high gear at which the speed ratio is smaller than 1.0, and the low gears at which the speed ratio is larger than or equal to 1.0. As a result, the differential portion 11 functions as the sub-transmission, and the automatic shift portion 20 that is directly connected to the differential portion 11 functions as the stepped transmission. Accordingly, the entire shift mechanism 10 functions as the so-called stepped transmission.

However, when it is determined that the vehicle condition is in the CVT control region where the shift mechanism 10 should be placed in the CVT mode, the switching control means 50 outputs, to the hydraulic control circuit 42, the instruction for disengaging the switching clutch C0 and the switching brake B0, that is, the instruction for stopping the output of the engagement hydraulic pressure $P_{C0}$ from the linear solenoid valve SLC0 and stopping the output of the engagement hydraulic pressure $P_{B0}$ from the linear solenoid valve SLB0 so that the differential portion 11 is placed in the CVT mode, and therefore, the entire shift mechanism 10 is placed in the CVT mode. At the same time, the switching control means 50 outputs, to the hybrid control means 52, a signal that permits the hybrid control. In addition, the switching control means 50 outputs, to the stepped shift control means 54, a signal that shifts the automatic shift portion 20 to a predetermined gear in the CVT mode, or a signal that permits the automatic shift portion 20 to automatically shift according to the shift diagram shown in FIG. 7, which is prestored in the storage means 56. In this case, the stepped shift control means 54 performs the automatic shift control by operating the hydraulic frictional engagement devices except the switching clutch C0 and the switching brake B0 in the engagement operation table in FIG. 2. When the differential portion 11, which is placed in the CVT mode by the switching control means 50, functions as the CVT, and the automatic shift portion 20, which is directly connected to the differential portion 11, functions as the stepped transmission, appropriate driving power can be obtained. At the same time, the input rotational speed $N_{IN}$ of the automatic shift portion 20, that is, the rotational speed $N_{IN}$ of the transmitting member 18 is continuously changed at each of the first gear, the second gear, the third gear, and the fourth gear of the automatic shift portion 20. That is, the speed ratio is continuously changed in a certain range at each gear. As a result, the speed ratio is continuously changed between the first gear and the second gear, between the second gear and the third gear, and the third gear and the fourth gear. Thus, the entire shift mechanism 10 is placed in the CVT mode, and the total speed ratio γT of the shift mechanism 10 is continuously changed.

FIG. 7 will be described in detail. FIG. 7 is the shift diagram (i.e., the shift relation, or the shift map) that is prestored in the storage means 56, and that is used to determine the gear to which the automatic shift portion 20 should shift. FIG. 7 is an example of the shift diagram in which the vehicle speed V and the required output torque $T_{OUT}$ related to the driving power are used as parameters in the two-dimension coordinate. In FIG. 7, the solid lines are upshift lines, and chain lines are downshift lines.

The dash lines indicate a determination vehicle speed V1 and determination output torque T1 that are used to determine whether the vehicle condition is in the stepped shift control region or the CVT control region. That is, in FIG. 7, one dash line is a high-vehicle-speed determination line that indicates the determination vehicle speed V1. The determination vehicle speed V1 is a predetermined value that is used to whether the hybrid vehicle is driven at a high vehicle speed. Another dash line is a high-output-determination line that indicates the determination output torque T1. The determination output torque T1 is a predetermined value that is used to determine whether the vehicle is driven at a high output, that is, whether the vehicle is driven such that the value related to the driving power of the hybrid vehicle, for example, the torque $T_{OUT}$ output from the automatic shift portion 20 is high. Further, in FIG. 7, the two-dot chain lines, which deviate from the dash lines, indicate another boundary line between the stepped shift control region and the CVT control region.

When the output torque $T_{OUT}$ decreases, or the vehicle speed V decreases, the boundary line indicated by the two-dot chain lines are used. That is, FIG. 7 is the prestored switching diagram (the switching map, or the relational diagram) which includes the determination vehicle speed V1 and the determination output torque T1, and which is used when the switching control means 50 determines whether the vehicle condition is in the stepped shift control region or the CVT control region. In the switching diagram in FIG. 7, the vehicle speed V and the output torque $T_{OUT}$ are used as the parameters. A shift map including this switching diagram may be prestored in the storage means 56. This switching diagram may include at least one of the determination vehicle V1 and the determination output torque T1. Alternatively, a prestored switching line, which is defined using the vehicle speed V or the output torque $T_{OUT}$ as the parameter, may be employed.

Each of the above-described shift diagram, switching diagram, driving power source switching diagram, or the like may not be stored in the form of the map, and instead, may be stored in the form of a determination equation that compares the actual vehicle speed V and the determination vehicle speed V1, a determination equation that compares the output torque $T_{OUT}$ and the determination output torque T1, or the like. In this case, for example, the switching control means 50 determines whether the actual vehicle speed V, which indicates the vehicle condition, exceeds the determination vehicle speed V1. When the actual vehicle speed V exceeds the determination vehicle speed V1, for example, the switching control means 50 places the shift mechanism 10 in the stepped shift mode by engaging the switching brake B0. Alternatively, the switching control means 50 determines whether the torque $T_{OUT}$ output from the automatic shift portion 20, which indicates the vehicle condition, exceeds the determination output torque T1. When the output torque $T_{OUT}$ exceeds the determination output torque T1, for example, the switching control means 50 places the shift mechanism 10 in the stepped shift mode by engaging the switching clutch C0.

A failure may occur in at least one of the electric devices that are controlled to operate the differential portion 11 as the electric CVT, such as the motor, or the function of the at least one electric device may deteriorate. For example, a failure may occur in at least one of the devices related to the electric path from the generation of electric energy in the first motor M1 to the conversion of the electric energy to the mechanical energy, or the function of the at least one device may deteriorate. That is, a failure may occur in at least one of the first motor M1, the second motor M2, the inverter 58, the electric power storage device 60, and the transmission path connecting the devices, or the function of the at least one device may deteriorate due to low temperature. In these cases, even when the vehicle condition is in the CVT control region, the switching control means 50 may preferentially place the shift mechanism 10 in the stepped shift mode so that the vehicle can be driven. For example, in this case, the switching control means 50 determines whether a failure occurs in at least one of the electric devices that are controlled to operate the differential portion 11 as the electric CVT, such as the motor, or the function of the at least one electric device deteriorates. If a failure occurs, or the function deteriorates, the switching control means 50 places the shift mechanism 10 in the stepped shift mode.

The above-described value related to the driving power is the parameter that corresponds one-to-one with the driving power of the vehicle. The value related to the driving power may be the driving torque or the driving power applied to the driving wheels 38, the torque $T_{OUT}$ output from the automatic shift portion 20, the engine torque $T_E$, and the vehicle acceleration G. For example, the value related to the driving power may be an actual value, such as the engine torque $T_E$ or the like that is calculated based on the accelerator-pedal operation amount Acc or the throttle-valve opening amount $\theta_{TH}$ (or the amount of intake air, the air-fuel ratio, the amount of injected fuel) and the engine speed $N_E$, or an estimated value such as the required value (target value) of the engine torque $T_E$ that is calculated based on the accelerator-pedal operation amount Acc or the throttle-valve opening amount $\theta_{TH}$, the required value (target value) of the torque $T_{OUT}$ output from the automatic shift portion 20, and the required driving power. The above-described driving torque may be calculated based on the output torque $T_{OUT}$, taking into account the differential gear ratio, the radius of the driving wheel 38, and the like. Alternatively, the above-described driving torque may be directly detected using, for example, a torque sensor. Similarly, each of the above-described other torques and the like may be calculated or directly detected.

The determination vehicle speed V1 is set to avoid the situation where the fuel efficiency is deteriorated by placing the shift mechanism 10 in the CVT mode when the vehicle is driven at a high vehicle speed. That is, the determination vehicle speed V1 is set so that the shift mechanism 10 is placed in the stepped shift mode when the vehicle is driven at a high vehicle speed. That is, when the vehicle is driven at a high vehicle speed, the electric path is not used, and therefore, the shift mechanism 10 is effectively used as the stepped transmission of planetary gear type, which has high transmission efficiency.

The determination torque T1 is set according to the characteristic of the first motor M1. The first motor M1 does not bear the reaction torque when the output from the engine 8 is high, and the maximum electric energy output from the first motor M1 is reduced to reduce the size of the first motor M1. Alternatively, the determination torque T1 is set so that the shift mechanism 10 is placed in the stepped shift mode when the vehicle is driven at a high output, because it is considered that a higher priority is given to the driver's request for the change in the engine speed due to the shift, than to the driver's request for the fuel efficiency when the vehicle is driven at a high output. That is, when the vehicle is driven at a high output, the shift mechanism 10 functions as the stepped transmission in which the speed ratio is changed in a stepwise manner.

Figure 9:
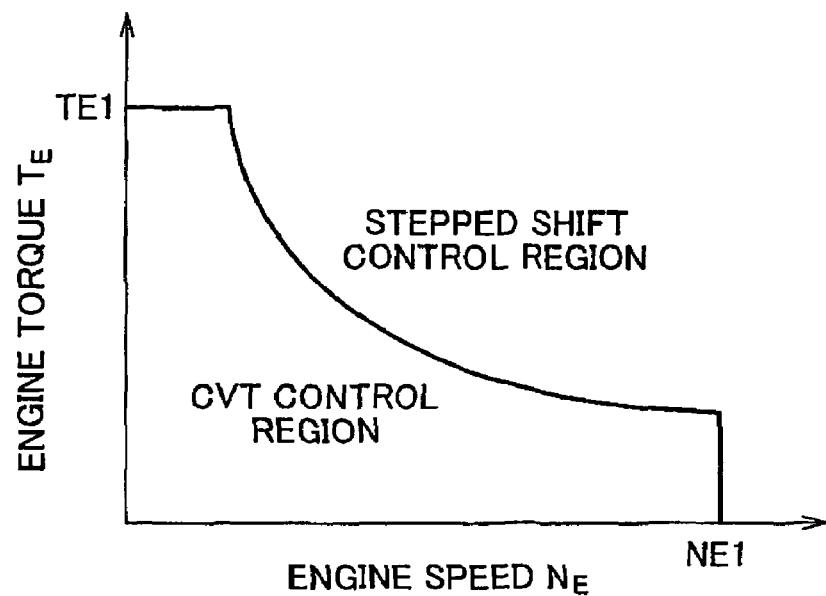
FIG. 9 is a prestored relational diagram which includes a boundary line between a CVT control region and a stepped shift control region, and which is a conceptual diagram used to set dash lines showing a boundary between the CVT control region and the stepped shift control region in FIG. 7.

FIG. 9 is a switching diagram (i.e., a switching map, or a relational diagram) that is prestored in, for example, the storage means 56. In the switching diagram in FIG. 9, the engine speed $N_E$ and the engine torque $T_E$ are used as parameters. The switching diagram in FIG. 9 includes an engine output line. The engine output line is a boundary line that is used when the switching control means 50 determines whether the vehicle condition is in the stepped shift control region or the CVT control region. The switching control means 50 may determine whether the vehicle condition indicated by the engine speed $N_E$ and the engine torque $T_E$ is in the stepped shift control region or the CVT control region, based on the engine speed $N_E$ and the engine torque $T_E$, using the switching diagram in FIG. 9, instead of the switching diagram in FIG. 7. FIG. 9 is a conceptual diagram that is used to set the dash lines in FIG. 7. In other words, the dash lines in FIG. 7 are the switching lines set in the two-dimension coordinate where the vehicle speed V and the output torque $T_{OUT}$ are used as the parameters, based on relational diagram (map) in FIG. 9.

As indicated by the relation in FIG. 7, the stepped shift control region is set to a high-torque region where the output torque $T_{OUT}$ is equal to or higher than the predetermined determination output torque T1, or a high-vehicle-speed region where the vehicle speed V is equal to or higher than the predetermined determination vehicle speed V1. Therefore, the vehicle is driven in the stepped shift mode when the torque output from the engine 8 is relatively high, or when the vehicle speed is relatively high. The vehicle is driven in the CVT mode when the torque output from the engine 8 is relatively low, or when the vehicle speed is relatively low, that is, when the output from the engine 8 is in a normal range.

As indicated by the relation in FIG. 9, the stepped shift control region is set to a high-torque region where the engine torque $T_E$ is equal to or higher than a predetermined value TE1, a high-speed region where the engine speed $N_E$ is equal to or higher than a predetermined value $N_E$, or a high-output region where the engine output, which is calculated based on the engine torque $T_E$ and the engine speed $N_E$, is equal to or higher than a predetermined value. Therefore, the vehicle is driven in the stepped shift mode when the torque output from the engine 8 is relatively high, when the engine speed is relatively high, or when the engine output is relatively high. The vehicle is driven in the CVT mode when the torque output from the engine 8 is relatively low, when the engine speed is relatively low, or when the engine output is relatively low, that is, when the output from the engine 8 is in a normal range. The boundary line between the stepped shift control region and the CVT control region in FIG. 9 corresponds to the high-vehicle-speed determination line that indicates the determination vehicle speed V1, and the high-output-determination line that indicates the determination output torque T1.

Thus, for example, when the vehicle is driven at a low-to-intermediate vehicle speed, or at a low-to-intermediate output, the shift mechanism 10 is placed in the CVT mode to achieve high fuel efficiency of the vehicle. When the vehicle is driven at a high speed, for example, when the actual vehicle speed V exceeds the determination vehicle speed V1, the shift mechanism 10 is placed in the stepped shift mode, that is, the shift mechanism 10 is operated as the stepped transmission. Therefore, the output from the engine 8 is transmitted to the driving wheels 38 only through the mechanical power transmission path. This prevents the loss in the conversion between the power and the electric energy, which would occur when the shift mechanism 10 is operated as the electric CVT.

When the vehicle is driven at a high output, for example, when the value related to the driving power, such as the output torque $T_{OUT}$ exceeds the determination torque T1, the shift mechanism 10 is placed in the stepped shift mode, that is, the shift mechanism 10 is operated as the stepped transmission. Therefore, the output from the engine 8 is transmitted to the driving wheels 38 only through the mechanical power transmission path. Accordingly, the shift mechanism 10 is operated as the electric CVT when the vehicle is driven at a low-to-intermediate vehicle speed, and when the vehicle is driven at a low-to-intermediate output. As a result, it is possible to reduce the maximum value of the electric energy that should be generated by the first motor M1, that is, the maximum value of the electric energy that should be transmitted by the first motor M1. This further reduces the size of the first motor M1, or the drive apparatus for the vehicle, which includes the first motor M1.

That is, the predetermined value TE1 is set in advance as a switching determination value of the engine torque $T_E$. That is, the predetermined value TE1 is used to determine whether the first motor M1 can bear the reaction torque based on the engine torque $T_E$. Thus, when the vehicle is driven at a high output, for example, when the engine torque $T_E$ exceeds the predetermined value TE1, the differential portion 11 is placed in the stepped shift mode, and therefore, the first motor M1 does not need to bear the reaction torque against the engine torque $T_E$ unlike when the differential portion 11 is in the CVT mode. This prevents the increase in the size of the first motor M1, and suppresses a decrease in the durability of the first motor M1. In other words, the maximum output from the first motor M1 in the embodiment is small as compared to a reaction torque capacity required based on the maximum value of the engine torque $T_E$. That is, the maximum output from the first motor M1 is small as compared to the reaction torque capacity required based on the high value of the engine torque $T_E$ that exceeds the predetermined value TE1. This reduces the size of the first motor M1.

The maximum output from the first motor M1 is a rated value of the first motor M1, which is empirically set so that the first motor M1 can be used in the usage environment. The switching determination value of the engine torque $T_E$ is the maximum value of the engine torque $T_E$ at which the first motor M1 can bear the reaction torque, or a value smaller than the maximum value by a predetermined value. That is, the switching determination value of the engine torque $T_E$ is empirically set to suppress a decrease in the endurance of the first motor M1.

Figure 10:
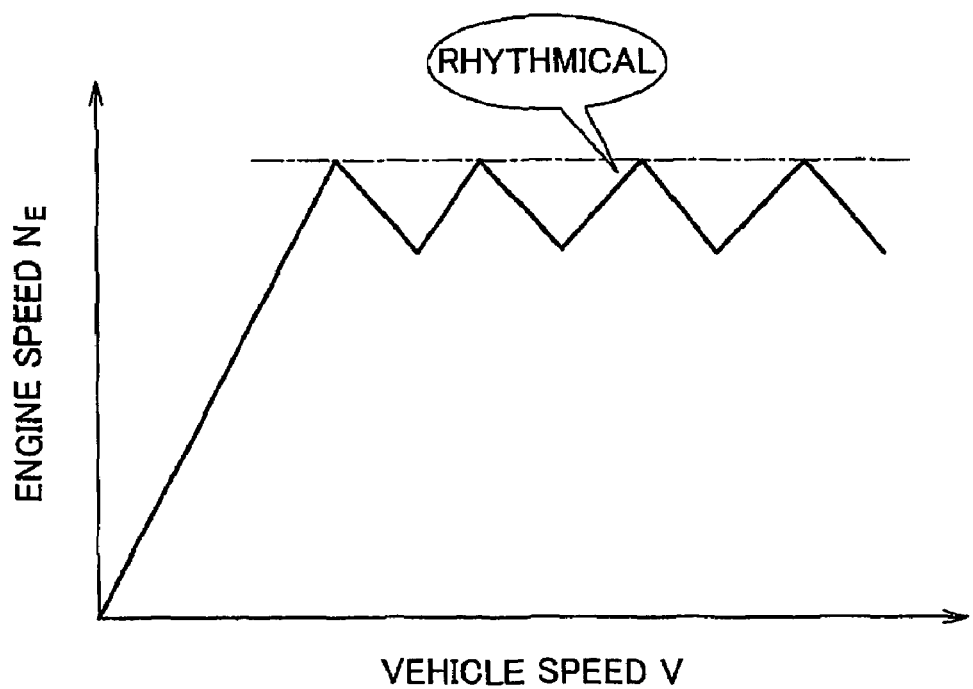
FIG. 10 shows an example of a change in an engine speed due to upshift of a stepped transmission.

When the vehicle is driven at a high output, the shift mechanism 10 is placed in the stepped shift mode (the speed-ratio fixed mode), because a higher priority is given to the driver's request for the driving power than to the driver's request for the fuel efficiency. Thus, for example, the user enjoys the change in the engine speed $N_E$ due to upshift in the stepped shift mode as shown in FIG. 10, that is, the rhythmical change in the engine speed $N_E$ due to the shift in the stepped shift mode.

Referring to FIG. 6, if at least one of the engagement hydraulic pressure $P_{C0}$ and the engagement hydraulic pressure $P_{B0}$ is output due to a failure, for example, in at least one of the linear solenoid valve SLC0 and the linear solenoid valve SLB0 when the switching control means 50 determines that the vehicle condition is in the CVT control region, fail-safe control means 80 outputs, to the hydraulic control circuit 42, the instruction for outputting the signal pressure $P_{SLF}$ from the solenoid valve SLF so that the limitation of the differential action of the differential portion 11 is stopped, that is, the cutoff means 104 is placed in the prohibition mode, that is, the first switching valve 106 and the second switching valve 108 are placed in the closed state to cut off (interrupt) the supply of the engagement hydraulic pressure $P_{C0}$ to the switching clutch C0 and the supply of the engagement hydraulic pressure $P_{B0}$ to the switching brake B0.

Thus, when the switching control means 50 determines that the vehicle condition is in the CVT control region, the fail-safe control means 80 may always output, to the hydraulic control circuit 42, the instruction for outputting the signal pressure $P_{SLF}$ from the solenoid valve SLF so that the first switching valve 106 and the second switching valve 108 are placed in the closed state, regardless of whether the at least one of the engagement hydraulic pressure $P_{C0}$ and the engagement hydraulic pressure $P_{B0}$ is output. However, when the switching control means 50 determines that the vehicle condition is in the CVT control region, the fail-safe control means 80 may place the first switching valve 106 and the second switching valve 108 in the closed state, if at least one of the engagement hydraulic pressure $P_{C0}$ and the engagement hydraulic pressure $P_{B0}$ is output.

For example, hydraulic-pressure switches (not shown), which detect the engagement hydraulic pressure $P_{C0}$ and the engagement hydraulic pressure $P_{B0}$, respectively, may be provided. Each hydraulic-pressure switch is turned on when a hydraulic pressure equal to or higher than a predetermined value is input to, for example, the output-side of the linear solenoid valve SLC0 or the linear solenoid valve SLB0, or the input-side of the hydraulic actuator $A_{C0}$ or the hydraulic actuator $A_{B0}$. The differential-action limitation determination means 82 determines whether the differential action of the differential portion 11 is limited by the switching clutch C0 or the switching brake B0 due to the output from at least one of the engagement hydraulic pressure $P_{C0}$ and the engagement hydraulic pressure $P_{B0}$, based on whether at least one of the hydraulic switches is on.

When the switching control means 50 determines that the vehicle condition is in the CVT control region, and the differential-action limitation determination means 82 determines that the differential action of the differential portion 11 is being limited, the fail-safe control means 80 outputs, to the hydraulic control circuit 42, the instruction for outputting the signal pressure $P_{SLF}$ from the solenoid valve SLF so that the first switching valve and the second switching valve 108 are placed in the closed state to cut off (interrupt) the supply of the engagement hydraulic pressure $P_{C0}$ to the switching clutch C0 and the supply of the engagement hydraulic pressure $P_{B0}$ to the switching brake B0.

Figure 11:
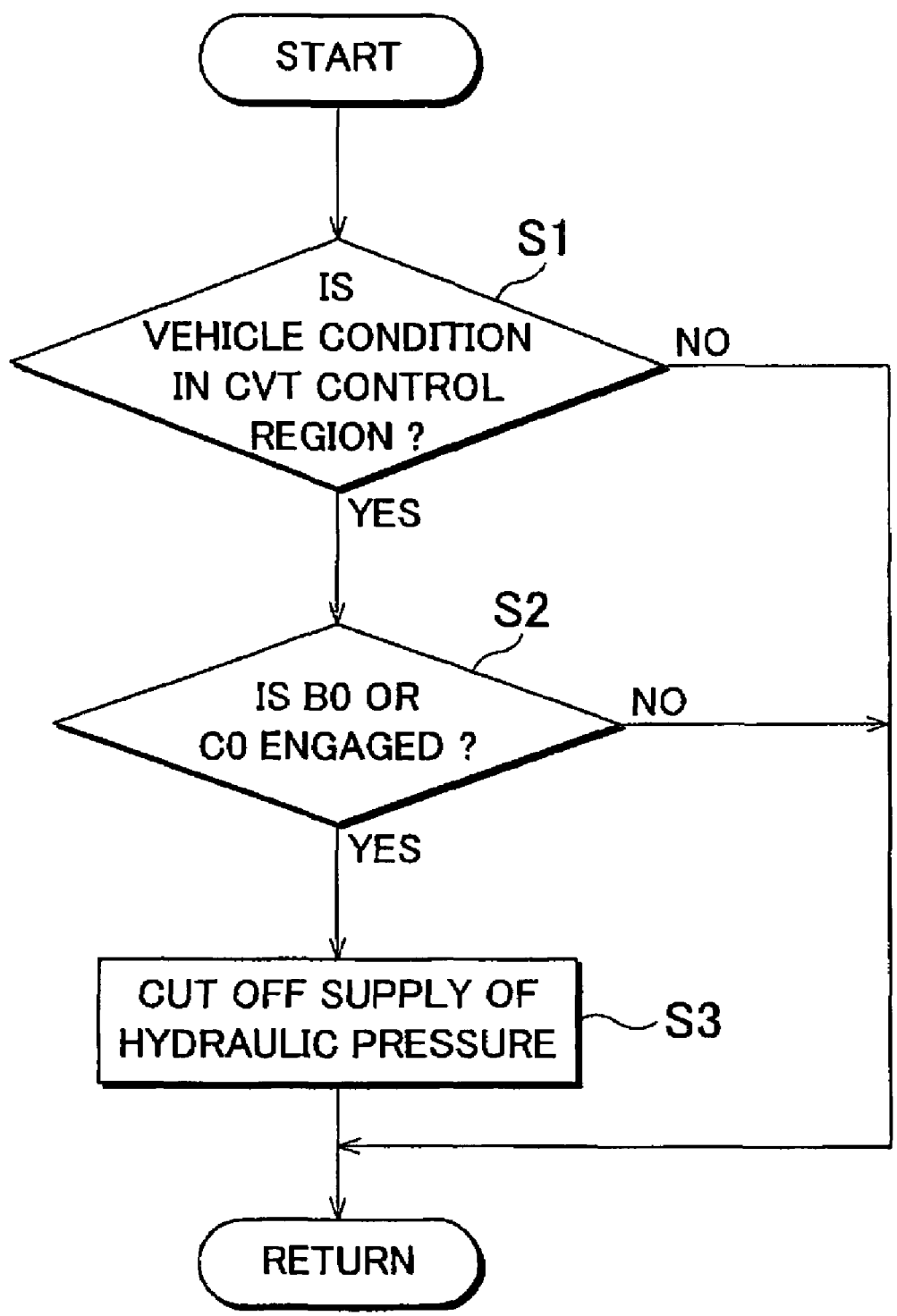
FIG. 11 is a flowchart showing a control operation performed by the electronic control unit in FIG. 6, that is, the control operation that avoids the situation where fuel efficiency is decreased, driveability is deteriorated, and a shock is caused by limiting the differential action of a differential portion using a switching clutch or a switching brake.

FIG. 11 is a flowchart explaining the control operation for suppressing the decrease in the fuel efficiency, deterioration of the driveability, and occurrence of a shock due to the main part of the control operation performed by the electronic control unit 40, that is, due to the differential action of the differential portion 11 being limited by the switching clutch C0 or the switching brake B0. This routine is executed in an extremely short cycle of, for example, several msec to several tens of msec, and the routine is repeatedly executed.

First, in step S1 that corresponds to the control performed by the switching control means 50, for example, it is determined whether the vehicle condition indicated by the vehicle speed V and the required output torque $T_{OUT}$ is in the CVT control region, using the switching diagram in FIG. 7 that is prestored, for example, in the storage means 56.

If a negative determination is made in step S1, the routine is finished. If an affirmative determination is made in step S1, in step S2 that corresponds to the control performed by the differential-action limitation determination means 82, it is determined whether the differential action of the differential portion 11 is limited by the switching clutch C0 or the switching brake B0 due to the output of at least one of the engagement hydraulic pressure $P_{C0}$ and the engagement hydraulic pressure $P_{B0}$, for example, based on whether one of the hydraulic-pressure switches is on.

If a negative determination is made in step S2, the routine is finished. If an affirmative determination is made in step S2, in step S3 that corresponds to the control performed by the fail-safe control means 80, the instruction for outputting the signal pressure $P_{SLF}$ from the solenoid valve SLF is output to the hydraulic control circuit 42 so that the first switching valve 106 and the second switching valve 108 are placed in the closed state to cut off (interrupt) the supply of the engagement hydraulic pressure $P_{C0}$ to the switching clutch C0 and the supply of the engagement hydraulic pressure $P_{B0}$ to the switching brake B0.

As described above, in the embodiment, when the vehicle condition is in the region where the differential action of the differential portion 11 should be limited, for example, in the stepped shift control region, the cutoff means 104 permits the switching clutch C0 or the switching brake B0 to limit the differential action of the differential portion 11. When the vehicle condition is in the region where the limitation of the differential action of the differential portion 11 should be stopped, for example, in the CVT control region or a motor-driven region, the cutoff means 104 prohibits the limitation of the differential action of the differential portion 11. Therefore, if the differential action may be limited due to a failure when the vehicle condition is in the region where the limitation of the differential action of the differential portion 11 should be stopped, the fail-safe function is performed to prohibit the limitation of the differential action. This prevents the decrease in the fuel efficiency, deterioration of the driveability, and occurrence of a shock due to the limitation of the differential action.

Also, in the embodiment, in the cutoff means 104, the oil passages are configured such that, when one of the first switching valve 106 and the second switching valve 108 is maintained in the open state, the other of the first switching valve 106 and the second switching valve 108 is maintained in the closed state based on the engagement hydraulic pressure $P_{C0}$ and the engagement hydraulic pressure $P_{B0}$. That is, the first switching valve 106 and the second switching valve 108 constitute a fail-safe circuit that prevents the switching clutch C0 and the switching brake B0 from being simultaneously engaged. Also, the oil passages are configured such that, when the vehicle condition is in the region where the limitation of the differential action of the differential portion 11 should be stopped, both of the first switching valve 106 and the second switching valve 108 are maintained in the closed state by supplying the signal pressure $P_{SLF}$, and accordingly the both of the switching clutch C0 and the switching brake B0 are disengaged. That is, in the cutoff means 104 in the embodiment, the first switching valve 106 and the second switching valve 108 constitute the fail-safe circuit that prevents the switching clutch C0 and the switching brake B0 from being simultaneously engaged. In addition, the first switching valve 106 and the second switching valve 108 have the cutoff function that disengages both of the switching clutch C0 and the switching brake B0. Thus, it is not necessary to provide, for example, a valve device used only for disengaging both of the switching clutch C0 and the switching brake B0. This suppresses increases in the cost and the required space.

Also, in the embodiment, when the vehicle condition is in the region where the limitation of the differential action of the differential portion 11 should be stopped, both of the first switching valve 106 and the second switching valve 108 are placed in the closed state by the signal pressure $P_{SLF}$ output from the solenoid valve SLF, and input to the first switching valve 106 and the second switching valve 108. As a result, both of the switching clutch C0 and the switching brake B0 are disengaged. Thus, the mode of the cutoff means 104 (the first switching valve 106 and the second switching valve 108) is easily switched between the permission mode and the prohibition mode by the signal pressure $P_{SLF}$.

Also, in the embodiment, if the differential-action limitation determination means 82 determines that the differential action of the differential portion 11 is being limited when the switching control means 50 determines that the vehicle condition is in the region where the limitation of the differential action of the differential portion 11 should be stopped, the fail-safe control means 80 places the cutoff means 104 in the prohibition mode for prohibiting the limitation of the differential action. Therefore, if the differential action may be limited by the switching clutch C0 or the switching brake B0 due to a failure when the vehicle condition is in the region where the limitation of the differential action of the differential portion 11 should be stopped, the fail-safe function is performed to prohibit the limitation of the differential action. This prevents the decrease in the fuel efficiency, deterioration of the driveability, and occurrence of a shock due to the limitation of the differential action.

Next, other embodiments of the invention will be described. In the following description, the same components in the embodiments are denoted by the same reference numerals, and the description thereof will be omitted.

Figure 14:
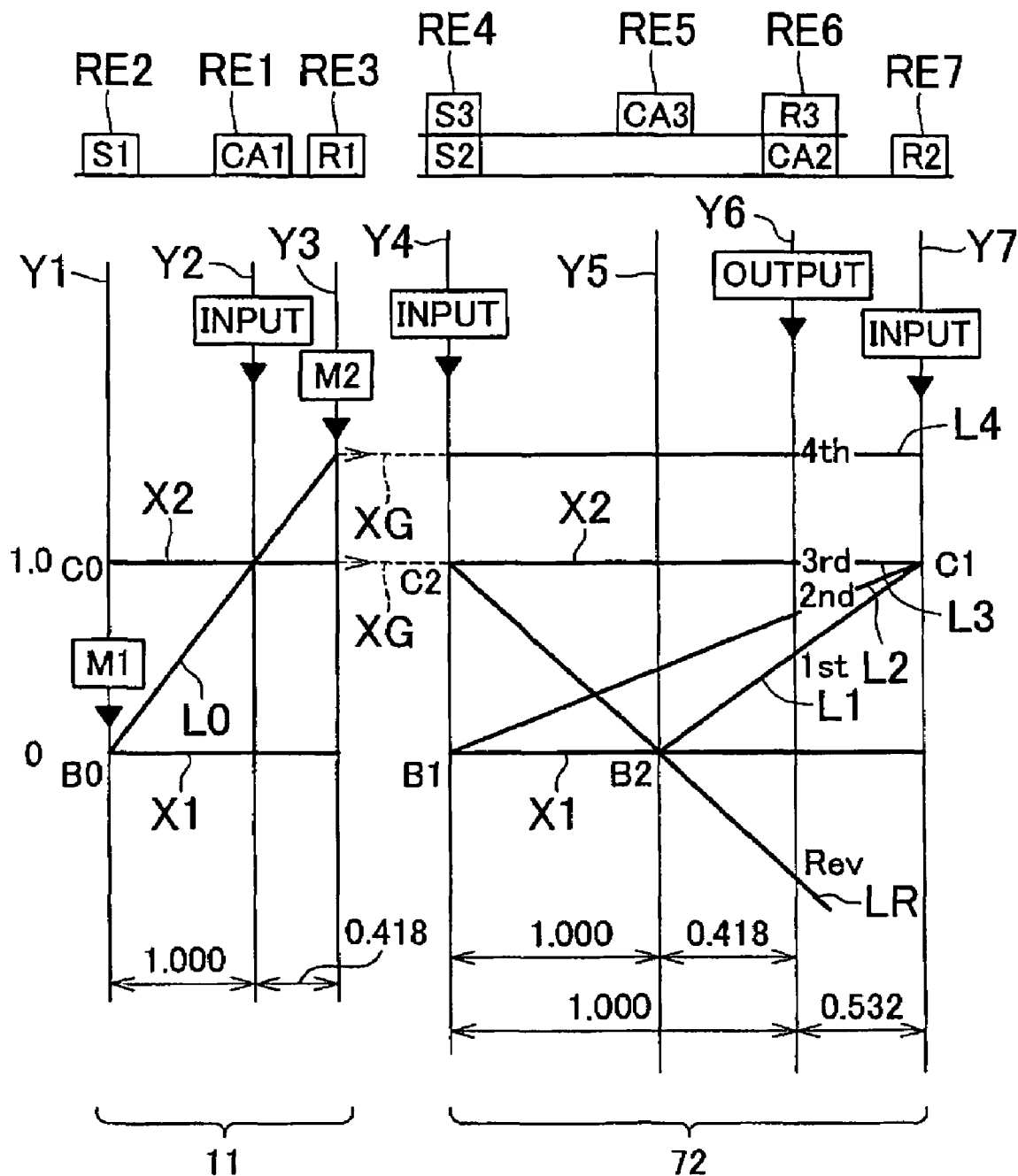
FIG. 14 is a collinear diagram explaining the relative rotational speeds at each gear when the drive apparatus for a hybrid vehicle according to the embodiment in FIG. 12 is operated in the stepped shift mode, FIG. 14 corresponding to FIG. 3.

FIG. 12 is a schematic diagram explaining the configuration of a shift mechanism 70 in a second embodiment. FIG. 13 is an engagement operation table showing the relation between each gear of the shift mechanism 70 and the combination of the hydraulic frictional engagement devices that are engaged. FIG. 14 is a collinear diagram explaining the shift operation of the shift mechanism 70. In FIG. 13, a circle indicates that the brake or the clutch is engaged. A double circle indicates that the brake or the clutch is engaged when the differential portion 11 is in the stepped shift mode, and the brake or the clutch is disengaged when the differential portion 11 is in the CVT mode.

The shift mechanism 70 includes the differential portion 11, and an automatic shift portion 72, as in the first embodiment. The differential portion 11 includes the first motor M1, the power split mechanism 16, and the second motor M2. The automatic shift portion 72 is provided between the differential portion 11 and the output shaft 22, and directly connected to the differential portion 11 via the transmitting member 18. The power split mechanism 16 includes the first planetary gear unit 24, the switching clutch C0, and the switching brake B0. The first planetary gear unit 24 is of a single pinion type, and has the predetermined gear ratio ρ1 of, for example, approximately "0.418". The automatic shift portion 72 includes the second planetary gear unit 26 and the third planetary gear unit 28. The second planetary gear unit 26 is of a single pinion type, and has the predetermined gear ratio ρ2 of, for example, approximately "0.532". The third planetary gear unit 28 is of a single pinion type, and has the predetermined gear ratio ρ2 of, for example, approximately "0.418". The second sun gear S2 of the second planetary gear unit 26 and the third sun gear S3 of the third planetary gear unit 28, which are integrally connected to each other, are selectively connected to the transmitting member 18 via the second clutch C2. Also, the second sun gear S2 and the third sun gear S3 are selectively connected to the case 12 via the first brake B1. The second carrier CA2 of the second planetary gear unit 26 and the third ring gear R3 of the third planetary gear unit 28, which are integrally connected to each other, are connected to the output shaft 22. The second ring gear R2 is selectively connected to the transmitting member 18 via the first clutch C1. The third carrier CA3 is selectively connected to the case 12 via the second brake B2.

In the shift mechanism 70 that has the above-described configuration, for example, as shown in the engagement operation table in FIG. 13, the switching clutch C0, the first clutch C1, the second clutch C2, the switching brake B0, the first brake B1, and the second brake B2 are selectively engaged. As a result, any one of the first gear to the fourth gear, or the reverse gear, or the neutral state is selected. That is, the speed ratio γ (=the input-shaft rotational speed $N_{IN}$/the output-shaft rotational speed $N_{OUT}$) at each gear is achieved. The speed ratio γ changes substantially geometrically. Particularly in the embodiment, the power split mechanism 16 includes the switching clutch C0 and the switching brake B0. By engaging the switching clutch C0 or the switching brake B0, the differential portion 11 is placed in the speed-ratio fixed mode, that is, the differential portion 11 is operated as the transmission with at least one fixed speed ratio. Thus, when the differential portion 11, which is placed in the speed-ratio fixed mode by engaging the switching clutch C0 or the switching brake B0, is combined with the automatic shift portion 72, the shift mechanism 70 is placed in the stepped shift mode, that is, the shift mechanism 70 is operated as the stepped transmission. When the differential portion 11, which is placed in the CVT mode by disengaging both of the switching clutch C0 and the switching brake B0, is combined with the automatic shift portion 72, the shift mechanism 70 is placed in the CVT mode, that is, the shift mechanism 70 is operated as the electric CVT transmission. In other words, the shift mechanism 70 is placed in the stepped shift mode by engaging the switching clutch C0 or the switching brake B0. The shift mechanism 70 is placed in the CVT mode by disengaging both of the switching clutch C0 and the switching brake B0.

As shown in FIG. 13, for example, when the shift mechanism 70 functions as the stepped transmission, the first gear, at which a speed ratio γ1 is set to the maximum value, for example, approximately "2.804", is selected by engaging the switching clutch C0, the first clutch C1, and the second brake B2. The second gear, at which a speed ratio γ2 is set to a value smaller than the speed ratio γ1, for example, approximately "1.531", is selected by engaging the switching clutch C0, the first clutch C1, and the first brake B1. The third gear, at which a speed ratio γ3 is set to a value smaller than the speed ratio γ2, for example, approximately "1.000", is selected by engaging the switching clutch C0, the first clutch C1, and the second clutch C2. The fourth gear, at which a speed ratio γ4 is set to a value smaller than the speed ratio γ3, for example, approximately "0.705", is selected by engaging the first clutch C1, the second clutch C2, and the switching brake B0. The reverse gear, at which a speed ratio γR is set to a value between the speed ratios γ1 and γ2, for example, approximately "2.393", is selected by engaging the second clutch C2 and the second brake B2. The neutral state is selected, for example, by engaging only the switching clutch C0.

For example, when the shift mechanism 70 functions as the CVT, both of the switching clutch C0 and the switching brake B0 are disengaged, as shown in the engagement operation table in FIG. 3. As a result, the differential portion 11 functions as the CVT, and the automatic shift portion 72 directly connected to the differential portion 11 functions as the stepped transmission. Thus, the rotational speed $N_{IN}$ input to the automatic transmission 72, that is, the rotational speed $N_{IN}$ of the transmitting member 18 is continuously changed at each of the first gear to third gear. That is, the speed ratio is continuously changed in a certain range at each of the first gear to the third gear. As a result, the speed ratio is continuously changed between the first gear and the second gear, and between the second gear and the third gear. Accordingly, the total speed ratio γT of the shift mechanism 10 is continuously changed.

FIG. 14 is a collinear diagram in which straight lines indicate the relative relation among the rotational speeds of the rotational elements in the shift mechanism 10 that includes the differential portion 11 and the automatic shift portion 72. Each of the rotational elements is in the connected state or in the disconnected state at each gear. The differential portion 11 functions as the CVT portion or the first shift portion. The automatic shift portion 72 functions as the stepped shift portion or the second shift portion. When both of the switching clutch C0 and the switching brake B0 are disengaged, and when the switching clutch C0 or the switching brake B0 is engaged, the rotational speed of each element of the power split mechanism 16 is the same as that in the first embodiment.

In FIG. 14, the vertical line Y4 indicates the relative rotational speed of the second sun gear S2 and the third sun gear S3, which are connected to each other, and which are regarded as the fourth rotational element (fourth element) RE4. The vertical line Y5 indicates the relative rotational speed of the third carrier CA3 that is regarded as the fifth rotational element (fifth element) RE5. The vertical line Y6 indicates the relative rotational speed of the second carrier CA2 and the third ring gear R3, which are connected to each other, and which are regarded as the sixth rotational element (sixth element) RE6. The vertical line Y7 indicates the relative rotational speed of the second ring gear R2 that is regarded as the seventh rotational element (seventh element) RE7. In the automatic shift portion 72, the fourth rotational element RE4 is selectively connected to the transmitting member 18 via the clutch C2. Also, the fourth rotational element RE4 is selectively connected to the case 12 via the first brake B1. The fifth rotational element RE5 is selectively connected to the case 12 via the second brake B2. The sixth rotational element RE6 is connected to the output shaft 22 of the automatic shift portion 72. The seventh rotational element RE7 is selectively connected to the transmitting member 18 via the first clutch C1.

As shown in FIG. 14, in the automatic shift portion 72, the rotational speed of the output shaft 22 at the first gear is indicated by the intersection of the oblique straight line L1 and the vertical line Y6. The straight line L1 is set by engaging the first clutch C1 and the second brake B2. The straight line L1 passes through the intersection of the vertical line Y7 that indicates the rotational speed of the seventh rotational element RE7 (R2), and the horizontal line X2, and the intersection of the vertical line Y5 that indicates the rotational speed of the fifth rotational element RE5 (CA3) and the horizontal line X1. The vertical line Y6 indicates the rotational speed of the sixth rotational element RE6 (CA2, R3) connected to the output shaft 22. Similarly, the rotational speed of the output shaft 22 at the second gear is indicated by the intersection of the oblique straight line L2 and the vertical line Y6. The straight line L2 is set by engaging the first clutch C1 and the first brake B1. The rotational speed of the output shaft 22 at the third gear is indicated by the intersection of the oblique straight line L3 and the vertical line Y6. The straight line L3 is set by engaging the first clutch C1 and the second clutch C2. At the first gear to the third gear, the switching clutch C0 is engaged. Thus, the power is input from the differential portion 11 to the seventh rotational element RE7 such that the rotational speed of the seventh rotational element RE7 is the same as the engine speed $N_E$. However, if the switching brake B0 is engaged instead of the switching clutch C0, the power is input from the differential portion 11 to the seventh rotational element RE7 such that the rotational speed of the seventh rotational element RE7 is higher than the engine speed $N_E$. Therefore, the rotational speed of the output shaft 22 at the fourth gear is indicated by the intersection of the horizontal straight line L4 and the vertical line Y6. The straight line L4 is set by engaging the first clutch C1, the second clutch C2, and the switching brake B0.

The shift mechanism 70 in the embodiment also includes the differential portion 11, which functions as the CVT portion or the first shift portion, and the automatic shift portion 72, which function as the stepped shift portion or the second shift portion. Accordingly, it is possible to obtain the same effects as those obtained in the first embodiment.

Figure 15:
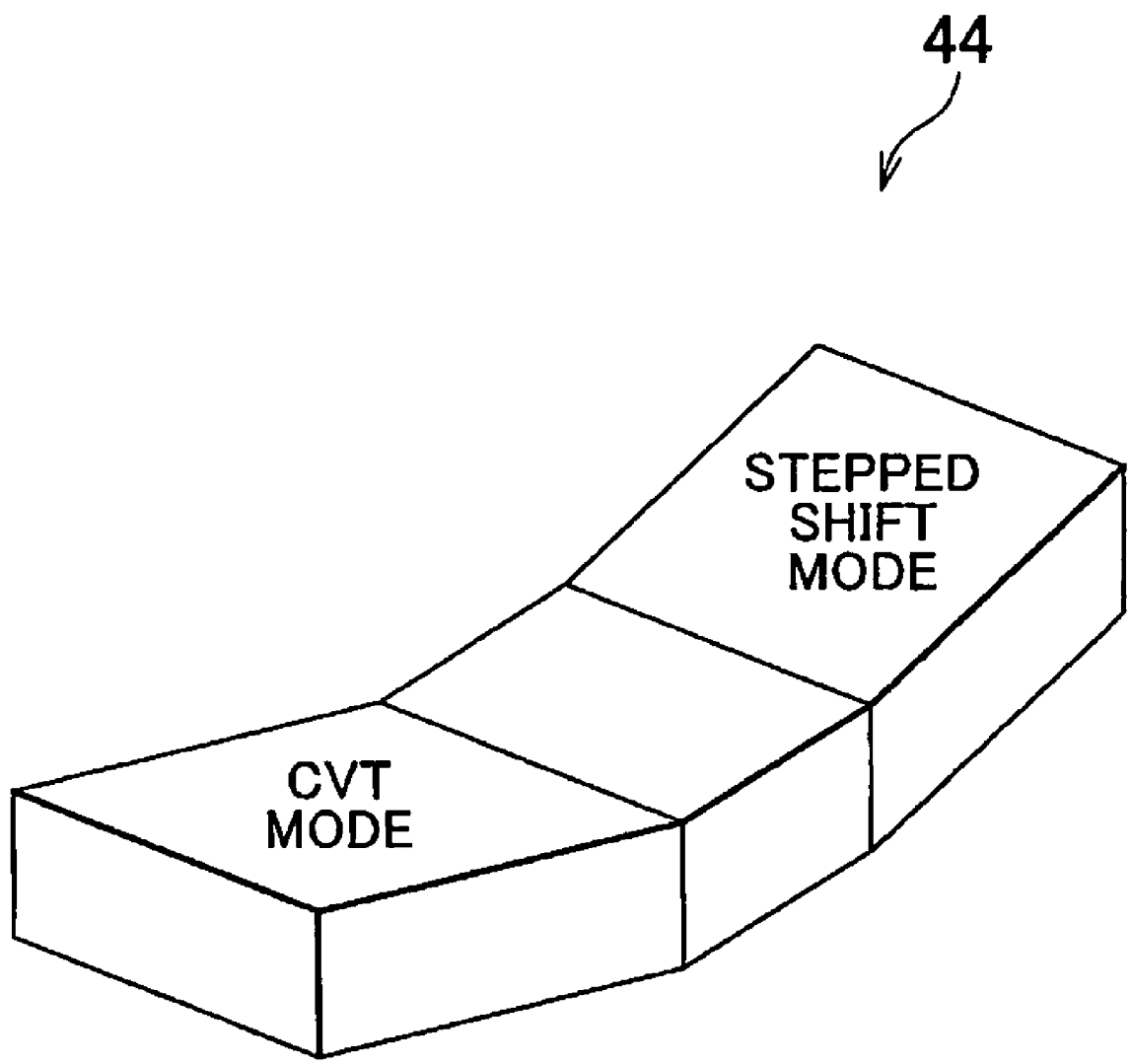
FIG. 15 shows an example of a shift mode manual selection device which is a rocker switch, and which is operated by a user to select the shift mode.

FIG. 15 is an example of a rocker switch 44 (hereinafter, simply referred to as "switch"), that is a shift-mode manual selection device. The switch 44 is used to manually select the mode of the power split mechanism 16 between the differential mode (the unlocked mode) and the non-differential mode (the locked mode). That is, the switch 44 is used to manually select the mode of the shift mechanism 10 between the CVT mode and the stepped shift mode. The switch 44 is provided in the vehicle such that the user can manually operate the switch 44. The switch 44 makes it possible to drive the vehicle in the mode desired by the user. The user can select the mode of the shift mechanism 10 between the CVT mode and the stepped shift mode by pressing a stepped-shift-mode instruction button or a CVT-mode instruction button of the switch 44. The term "Stepped shift mode" is displayed on the stepped-shift-mode instruction button. The term "CVT mode" is displayed on the CVT-mode instruction button. When the shift mechanism 10 is in the CVT mode, the vehicle is driven in the CVT mode, and the shift mechanism 10 can be operated as the electric CVT. When the shift mechanism 10 is in the stepped shift mode, the vehicle is driven in the stepped shift mode, and the shift mechanism 10 can be operated as the stepped transmission.

In the above-described embodiment, the automatic switching control is executed to automatically switch the shift mode of the shift mechanism 10 based on the vehicle condition, using, for example, the relational diagram in FIG. 7. In this embodiment, instead of the automatic switching control, or in addition to the automatic switching control, the manual switching control is executed, that is, the shift mode of the shift mechanism 10 is switched by manually operating, for example, the switch 44. That is, the switching control means 50 preferentially switches the shift mode of the shift mechanism 10 between the CVT mode and the stepped shift mode, according to the operation of the switch 44 for selecting the shift mode of the shift mechanism 10 between the CVT mode and the stepped shift mode. For example, when the user wants to improve the fuel efficiency, the user selects the CVT mode of the shift mechanism 10 by manual operation. When the user wants to rhythmically change the engine speed by causing the stepped transmission to shift, the user places the shift mechanism 10 in the stepped shift mode by manual operation.

Also, the neutral position may be provided in the switch 44. In this case, when the neutral position is selected in the switch 44, that is, when the user does not select the desired shift mode, or when the user wants to automatically switch the shift mode, the automatic switching control may be executed to automatically switch the shift mode of the shift mechanism 10.

For example, when the control is switched from the automatic switching control to the manual switching control by manually operating the switch 44, that is, when the shift mode of the shift mechanism 10 is manually controlled, in step S1 of the flowchart shown in FIG. 11 in the above-described embodiment, it is determined whether the vehicle condition is in the CVT control region, based on whether the differential mode of the power split mechanism 16, that is, the CVT mode of the shift mechanism 10 is selected by manually operating the switch 44.

The embodiments of the invention have been described in detail with reference to the drawings. However, the invention may be realized in other embodiments.

For example, in the above-described embodiments, the fail-safe control means 80 places the first switching valve 106 and the second switching valve 108 in the closed state, thereby cutting off (interrupting) the supply of the engagement hydraulic pressure $P_{C0}$ to the switching clutch C0 and the supply of the engagement hydraulic pressure $P_{B0}$ to the switching brake B0, when the vehicle condition is in the CVT control region where the shift mechanism 10 should be placed in the CVT mode, that is, the CVT control region where the limitation of the differential action of the differential portion 11 should be stopped, that is, the region other than the stepped shift control region where the differential action of the differential portion 11 should be limited, that is, the region other than the region where the switching clutch C0 or the switching brake B0 should be normally engaged. However, the fail-safe control means 80 may place the first switching valve 106 and the second switching valve 108 in the closed state only in a region where a severe shock may occur, for example, in a region where the vehicle speed is low, or a motor-driven region, instead of placing the first switching valve 106 and the second switching valve 108 in the entire CVT control region.

In each of the above-described embodiments, the cutoff means 104 includes the solenoid valve SLF used only for outputting the signal pressure $P_{SLF}$ for placing the first switching valve 106 and the second switching valve 108 in the closed state. However, the hydraulic pressure supplied from the solenoid valve that controls the shift of the automatic shift portion 20 may be used as the signal pressure $P_{SLF}$.

Also, in each of the above-described embodiments, in the cutoff means 104, the first switching valve 106 and the second switching valve 108 constitute the fail-safe circuit that prevents the switching clutch C0 and the switching brake B0 from being simultaneously engaged, and the first switching valve 106 and the second switching valve 108 have the cutoff function that disengages both of the switching clutch C0 and the switching brake B0. However, a valve device having the cutoff function that disengages both of the switching clutch C0 and the switching brake B0 may be provided separately from the first switching valve 106 and the second switching valve 108.

In the cutoff means 104 in each of the above-described embodiments, the first switching valve 106, the second switching valve 108, and the oil passages may have various configurations in addition to the configuration in each of the above-described embodiments, as long as the first switching valve 106, the second switching valve 108, and the oil passages constitute the fail-safe circuit that prevents the switching clutch C0 and the switching brake B0 from being simultaneously engaged. For example, instead of inputting the engagement hydraulic pressure $P_{C0}$ to the oil chamber 126, and inputting the engagement hydraulic pressure $P_{C0}$ output from the output port 114 to the oil chamber 118, the engagement hydraulic pressure $P_{C0}$ output from the output port 114 may be input to the oil chamber 126. In addition, instead of inputting the engagement hydraulic pressure $P_{B0}$ to the oil chamber 116, and inputting the engagement hydraulic pressure $P_{B0}$ output from the output port 124 to the oil chamber 128, the engagement hydraulic pressure $P_{B0}$ output from the output port 124 may be input to the oil chamber 116. A damper or the like may be provided in the hydraulic circuit 100.

In the shift mechanism 10 or 70 in each of the above-described embodiments, the mode of the differential portion 11 (the power split mechanism 16) is switched between the differential mode and the non-differential mode (the locked mode). When the differential portion 11 is in the differential mode, the differential portion 11 can be operated as the electric CVT. When the differential portion 11 is in the non-differential mode, the differential portion 11 cannot be operated as the electric CVT. Thus, the mode of the shift mechanism 10 or 70 is switched between the CVT mode and the stepped shift mode. That is, by switching the mode of the differential portion 11 between the differential mode and the non-differential mode, the mode of the shift mechanism 10 or 70 is switched between the CVT mode and the stepped shift mode. However, for example, even when the differential portion 11 remains in the differential mode, the shift mechanism 10 or 70 can be operated as the stepped transmission by changing the speed ratio of the differential portion 11 in a stepwise manner, instead of continuously changing the speed ratio of the differential portion 11. In other words, the differential mode and the non-differential mode of the differential portion 11 do not necessarily correspond one-to-one with the CVT mode and the stepped shift mode of the shift mechanism 10 or 70. Therefore, the mode of the differential 11 does not necessarily need to be switched between the differential mode and the non-differential mode. The invention can be applied as long as the mode of the shift mechanism 10 or 70 (the differential portion 11, or the power split mechanism 16) can be switched between the CVT mode and the non-CVT mode.

Also, in the power split mechanism 16 in each of the above-described embodiments, the first carrier CA1 is connected to the engine 8, the first sun gear S1 is connected to the first motor M1, and the first ring gear R1 is connected to the transmitting member 18. However, the connection relation is not necessarily limited to this. Each of the engine 8, the first motor M1, and the transmitting member 18 may be connected to any of the three elements CA1, S1, and R1 of the first planetary gear unit 24.

In each of the above-described embodiments, the engine 8 is directly connected to the input shaft 14. However, for example, the engine 8 may be operatively connected to the input shaft 14 via a gear, a belt, or the like. The engine 8 and the input shaft 14 do not necessarily need to be provided on a common axis.

In each of the above-described embodiments, the first motor M1 and the second motor M2 are disposed coaxially with the input shaft 14, the first motor M1 is connected to the first sun gear S1, and the second motor M2 is connected to the transmitting member 18. However, the first motor M1 and the second motor M2 do not necessarily need to be provided in this manner. For example, the first motor M1 may be operatively connected to the first sun gear S1 via a gear, a belt, a reducer, or the like, and the second motor M2 may be operatively connected to the transmitting member 18 via a gear, a belt, a reducer, or the like. The second motor M2 may be connected to the output shaft 22 or the rotational member in the automatic shift portion 20 or 72, instead of the transmitting member 18. As an example of the configuration in which the second motor M2 is provided in the power transmission path from the transmitting member to the driving wheels, the second motor M2 may be connected to the transmitting member 18, the output shaft 22, or the like, via a gear, a belt, a reducer, or the like.

The above-described power split mechanism 16 includes the switching clutch C0 and the switching brake B0. However, both of the switching clutch C0 and the switching brake B0 do not necessarily need to be provided. The switching clutch C0 selectively connects the sun gear S1 and the carrier CA1. However, the switching clutch C0 may selectively connect the sun gear S1 and the ring gear R1, or the carrier CA1 and the ring gear R1. That is, the switching clutch C0 may connect any two of the three elements of the first planetary gear unit 24.

When the neutral "N" is selected in each of the shift mechanisms 10 and 70 in the above-described embodiments, the switching clutch C0 is engaged. However, the switching clutch C0 does not necessarily need to be engaged when the neutral "N" is selected.

Each of the hydraulic frictional engagement devices, such as the switching clutch C0 and the switching brake B0, in the above-described embodiments may be a magnetic-particle engagement device such as a magnetic-particle clutch, an electromagnetic engagement device such as an electromagnetic clutch, or a mechanical clutch such as a mesh dog clutch. For example, when the electromagnetic clutch is employed, the cutoff means 104 is not the valve device that switches the oil passage. Instead, the cutoff means 104 may be a switching device, an electromagnetic switching device, or the like, which switches the state of an electric instruction signal circuit that provides an electric instruction signal to the electromagnetic clutch.

In each of the above-described embodiments, the automatic shift portion 20 or 72 is provided in the power transmission path between the transmitting member 18, which is the output member of the differential portion 11 (i.e., the power split mechanism 16), and the driving wheels 38. However, other power transmission devices (transmissions) may be provided in the power transmission path. For example, a continuously variable transmission (CVT) that is one of automatic transmissions, an automatic transmission of a constant mesh parallel two-axes type in which a gear is automatically selected using a select cylinder and a shift cylinder, or a synchromesh manual transmission in which a gear is manually selected, may be provided. When the CVT is provided, by placing the power split mechanism 16 in the speed-ratio fixed mode, the entire shift mechanism 10 or 70 is placed in the stepped shift mode. When the shift mechanism 10 or 70 is in the stepped shift mode, the power is transmitted only through the mechanical transmission path, without using the electric path. Alternatively, in the above-described CVT, a plurality of fixed speed ratios that correspond to the gears of the stepped transmission may be prestored, and the CVT may shift using the plurality of fixed speed ratios, in the same manner as in the automatic shift portion 20 or 72 shifts. The invention can be applied even if the automatic shift portion 20 or 72 is not provided.

In each of the above-described embodiments, the automatic shift portion 20 or 72 is connected to the differential portion 11 in series via the transmitting member 18. However, the input shaft 14 may be provided in parallel with a counter shaft, and the automatic shift portion 20 or 72 may be coaxially provided on the counter shaft. In this case, the differential portion 11 is connected to the automatic shift portion 20 or 72 so that power can be transmitted, via a transmitting member set which includes a counter gear pair, a sprocket, and a chain, and which functions as the transmitting member 18.

In each of the above-described embodiments, the power split mechanism 16, which functions as the differential mechanism, may be a differential gear unit that includes a pinion that is rotated by the engine, and a pair of bevel gears that meshes with the pinion. In this case, the differential gear unit is operatively connected to the first motor M1 and the second motor M2.

In each of the above-described embodiments, the power split mechanism 16 includes one planetary gear unit. However, the power split mechanism 16 may include at least two planetary gear units. When the power split mechanism 16 is in the non-differential mode (the speed-ratio fixed mode), the power split mechanism 16 may function as a transmission with at least three gears. Each of the at least two planetary gear units is not limited to the planetary gear unit of a single pinion type, and may be a planetary gear unit of a double pinion type.

In the above-described embodiment, the switch 44 is the rocker switch. However, the switch 44 may be any switch that switches the shift mode at least between the CVT mode (the differential mode) and the stepped shift mode (the non-differential mode), such as a push-button switch, a switch including two push-buttons, in which only one of the two buttons can be kept pushed, a lever switch, and a slide switch. Instead of providing the neutral position in the switch 44, another switch may be provided separately from the switch 44, and an enabling position and a disenabling position equivalent to the neutral position may be provided in the other switch. In this case, when the enabling position is selected, the mode selected in the switch 44 is enabled. When the disenabling position is selected, the mode selected in the switch 44 is disenabled. Instead of the switch 44, or in addition to the switch 44, a device that selects one of the CVT mode (the differential mode) and the stepped shift mode (the non-differential mode) in response to the voice of the driver, instead of the manual operation, a device that selects one of the CVT mode and the stepped shift mode according to foot operation, may be provided.

Thus, the embodiments of the invention that have been disclosed in the specification are to be considered in all respects as illustrative and not restrictive. Various changes and modifications may be made to the above-described embodiments, based on the knowledge of persons skilled in the art.

What is claimed is:

1. A drive apparatus for a vehicle, comprising:
   a differential portion that includes a differential mechanism that distributes an output from an engine of a vehicle to a first motor and a transmitting member, and a second motor provided in a power transmission path from the transmitting member to a driving wheel;
   a differential-action limitation device which is provided in the differential mechanism, and which limits a differential action of the differential portion by limiting a differential action of the differential mechanism, wherein the differential action of the differential portion is limited using the differential-action limitation device, and the limitation of the differential action is stopped using the deferential-action limitation device based on an actual vehicle condition, using regions defined based on a vehicle condition; and
   a cutoff device that permits the differential-action limitation device to limit the differential action of the differential portion when the actual vehicle condition is in a region where the differential action should be limited, and that prohibits the differential-action limitation device from limiting the differential action when the actual vehicle condition is in a region where limitation of the differential action should be stopped, wherein:
   the differential-action limitation device includes a first engagement device and a second engagement device;
   a state of the differential portion when the differential action of the differential portion is limited by engaging the first engagement device differs from a state of the differential portion when the differential action of the differential portion is limited by engaging the second engagement device;
   the cutoff device prevents the first engagement device and the second engagement device from being simultaneously engaged; and
   the cutoff device prohibits the limitation of the differential action by disengaging both of the first engagement device and the second engagement device, according to an instruction signal that is output when the actual vehicle condition is in the region where the limitation of the differential action of the differential portion should be stopped.

2. A drive apparatus for a vehicle comprising:
   a differential portion that includes a differential mechanism that distributes an output from an engine of a vehicle to a first motor and a transmitting member, and a second motor provided in a power transmission path from the transmitting member to a driving wheel;

a differential-action limitation device which is provided in the differential mechanism, and which limits a differential action of the differential portion by limiting a differential action of the differential mechanism, wherein the differential action of the differential portion is limited using the differential-action limitation device, and limitation of the differential action is stopped using the deferential-action limitation device, based on an actual vehicle condition, using regions defined based on a vehicle condition; and a cutoff device that permits the differential-action limitation device to limit the differential action of the differential portion when the actual vehicle condition is in a region where the differential action should be limited, and that prohibits the differential-action limitation device from limiting the differential action when the actual vehicle condition is in a region where limitation of the differential action should be stopped, wherein:

the differential-action limitation device includes a hydraulic engagement device that limits the differential action of the differential portion when the hydraulic engagement device is engaged;

the cutoff device opens and closes an oil passage that supplies a hydraulic pressure that is used to engage the hydraulic engagement device;

the hydraulic engagement device includes a first hydraulic engagement device and a second hydraulic engagement device;

a state of the differential portion when the differential action of the differential portion is limited by engaging the first hydraulic engagement device differs from a state of the differential portion when the differential action of the differential portion is limited by engaging the second hydraulic engagement device;

the cutoff device includes a first switching valve a second switching valve;

the first switching valve is provided to selectively switch a mode of the cutoff device between a permission mode for permitting the first hydraulic engagement device to limit the differential action, and a prohibition mode for prohibiting the first hydraulic engagement device from limiting the differential action;

the first switching valve is maintained in an open state to allow supply of a first hydraulic pressure that is used to engage the first hydraulic engagement device, and when a second hydraulic pressure that is used to engage the second hydraulic engagement device is input to the first switching valve, the first switching valve is placed in a closed state to interrupt the supply of the first hydraulic pressure;

the second switching valve is provided to selectively switch a mode of the cutoff device between the permission mode for permitting the second hydraulic engagement device to limit the differential action, and the prohibition mode for prohibiting the second hydraulic engagement device from limiting the differential action;

the second switching valve is maintained in an open state to allow supply of the second hydraulic pressure, and when the first hydraulic pressure is input to the second switching valve, the second switching valve is placed in a closed state to interrupt the supply of the second hydraulic pressure;

the first hydraulic engagement device and the second hydraulic engagement device are prevented from being simultaneously engaged by configuring an oil passage such that when one of the first switching valve and the second switching valve is maintained in the open state, the other of the first switching valve and the second switching valve is maintained in the closed state based on the first hydraulic pressure and the second hydraulic pressure;

when the actual vehicle condition is in the region where the limitation of the differential action of the differential portion should be stopped, both of the first switching valve and the second switching valve are maintained in the closed state to disengage both of the first hydraulic engagement device and the second hydraulic engagement device; and in the cutoff device, when a third hydraulic pressure, which is output when the vehicle condition is in the region where the limitation of the differential action of the differential portion should be stopped, is input to both of the first switching valve and the second switching valve, both of the first switching valve and the second switching valve are placed in the closed state to disengage both of the first hydraulic engagement device and the second hydraulic engagement device.

3. A drive apparatus for a vehicle, comprising:

a differential portion that includes a differential mechanism that distributes an output from an engine of a vehicle to a first motor and a transmitting member, and a second motor provided in a power transmission path from the transmitting member to a driving wheel;

a differential-action limitation device, which is provided in the differential mechanism, and which limits a differential action of the differential portion by limiting a differential action of the differential mechanism;

a switching control device that limits the differential action of the differential portion using the differential-action limitation device, and stops limitation of the differential action using the differential-action limitation device, based on an actual vehicle condition, using regions defined based on a vehicle condition;

a cutoff device whose mode is selectively switched between a permission mode for permitting the differential-action limitation device to limit the differential action of the differential portion, and a prohibition mode for prohibiting the differential-action limitation device from limiting the differential action;

a differential-action limitation determination device that determines whether the differential action of the differential portion is being limited by the differential-action limitation device; and a fail-safe control device that places the cutoff device in the prohibition mode when the actual vehicle condition is in a region where the switching control device should stop the limitation of the differential action of the differential portion, and the differential-action limitation determination device determines that the differential action of the differential portion is being limited, wherein:

the differential-action limitation device includes a first engagement device and a second engagement device;

a state of the differential portion when the differential action of the differential portion is limited by engaging the first engagement device differs from a state of the differential portion when the differential action of the differential portion is limited by engaging the second engagement device; and the cutoff device prevents the first engagement device and the second engagement device from being simultaneously engaged; and the cutoff device is placed in the prohibition mode to disengage both of the first engagement device and the second engagement device, according to an instruction signal that is output when the vehicle condition is in the region where the switching control device should stop the limitation of the differential action of the differential portion and the differential-action limitation determination device determines that the differential action of the differential portion is being limited.

4. A drive apparatus for a vehicle comprising:

a differential portion that includes a differential mechanism that distributes an output from an engine of a vehicle to a first motor and a transmitting member, and a second motor provided in a power transmission path from the transmitting member to a driving wheel;

a differential-action limitation device, which is provided in the differential mechanism, and which limits a differential action of the differential portion by limiting a differential action of the differential mechanism;

a switching control device that limits the differential action of the differential portion using the differential-action limitation device, and stops limitation of the differential action using the differential-action limitation device, based on an actual vehicle condition, using regions defined based on a vehicle condition;

a cutoff device whose mode is selectively switched between a permission mode for permitting the differential-action limitation device to limit the differential action of the differential portion, and a prohibition mode for prohibiting the differential-action limitation device from limiting the differential action;

a differential-action limitation determination device that determines whether the differential action of the differential portion is being limited by the differential-action limitation device; and a fail-safe control device that places the cutoff device in the prohibition mode when the actual vehicle condition is in a region where the switching control device should stop the limitation of the differential action of the differential portion, and the differential-action limitation determination device determines that the differential action of the differential portion is being limited, wherein:

the differential-action limitation device includes a hydraulic engagement device that limits the differential action of the differential portion when the hydraulic engagement device is engaged;

the cutoff device opens and closes an oil passage that supplies a hydraulic pressure that is used to engage the hydraulic engagement device;

the hydraulic engagement device includes a first hydraulic engagement device and a second hydraulic engagement device;

a state of the differential portion when the differential action of the differential portion is limited by engaging the first hydraulic engagement device differs from a state of the differential portion when the differential action of the differential portion is limited by engaging the second hydraulic engagement device;

the cutoff device includes a first switching valve, a second switching valve;

the first switching valve is provided to selectively switch a mode of the cutoff device between the permission mode for permitting the first hydraulic engagement device to limit the differential action, and the prohibition mode for prohibiting the first hydraulic engagement device from limiting the differential action;

the first switching valve is maintained in an open state to allow supply of a first hydraulic pressure that is used to engage the first hydraulic engagement device, and when a second hydraulic pressure that is used to engage the second hydraulic engagement device is input to the first switching valve, the first switching valve is placed in a closed state to interrupt the supply of the first hydraulic pressure;

the second switching valve is provided to selectively switch a mode of the cutoff device between the permission mode for permitting the second hydraulic engagement device to limit the differential action, and the prohibition mode for prohibiting the second hydraulic engagement device from limiting the differential action;

the second switching valve is maintained in an open state to allow supply of the second hydraulic pressure, and when the first hydraulic pressure is input to the second switching valve, the second switching valve is placed in a closed state to interrupt the supply of the second hydraulic pressure;

the first hydraulic engagement device and the second hydraulic engagement device are prevented from being simultaneously engaged by configuring an oil passage such that when one of the first switching valve and the second switching valve is maintained in the open state, the other of the first switching valve and the second switching valve is maintained in the closed state, based on the first hydraulic pressure and the second hydraulic pressure;

when the vehicle condition is in the region where the switching control device should stop the limitation of the differential action of the differential portion, and the differential-action limitation determination device determines that the differential action of the differential portion is being limited, the fail-safe control device maintains both of the first switching valve and the second switching valve in the closed state to disengage both of the first hydraulic engagement device and the second hydraulic engagement device; and the cutoff device includes a third-hydraulic pressure generation device that outputs a third hydraulic pressure that places both of the first switching valve and the second switching valve in the closed state, when the vehicle condition is in the region where the switching control device should stop the limitation of the differential action of the differential portion, and the differential-action limitation determination device determines that the differential action of the differential portion is being limited.

* * * * *